United States Patent [19]
Sivik et al.

[11] Patent Number: 5,674,819
[45] Date of Patent: Oct. 7, 1997

[54] CARBOXYLIC COMPOSITIONS, DERIVATIVES, LUBRICANTS, FUELS AND CONCENTRATES

[75] Inventors: Matthew R. Sivik, Parma; David E. Ripple, Kirtland, both of Ohio

[73] Assignee: The Lubrizol Corporation, Wickliffe, Ohio

[21] Appl. No.: 555,630

[22] Filed: Nov. 9, 1995

[51] Int. Cl.$^6$ .................. C10M 145/00; C10M 149/00
[52] U.S. Cl. .............. 508/234; 508/241; 508/466; 525/71; 525/78; 525/178; 525/179; 525/379; 525/384; 525/386; 585/18
[58] Field of Search .................. 508/234, 241, 508/466; 525/178, 179, 386, 379, 384, 78, 71; 585/18

[56] References Cited

U.S. PATENT DOCUMENTS

| | | | |
|---|---|---|---|
| Re. 31,680 | 9/1984 | Caywood | 525/285 |
| 2,537,627 | 1/1951 | Weissert et al. | 260/94.7 |
| 3,184,413 | 5/1965 | Furey et al. | |
| 3,215,707 | 11/1965 | Rense | 260/326.3 |
| 3,231,587 | 1/1966 | Rense | 260/346.8 |
| 3,499,839 | 3/1970 | Bolhm | |
| 3,935,249 | 1/1976 | Puskas et al. | 260/346.8 R |
| 3,944,539 | 3/1976 | Horodysky et al. | 260/139 |
| 3,960,900 | 6/1976 | Puskas et al. | 524/469 |
| 3,975,271 | 8/1976 | Saunier et al. | 210/62 |
| 4,010,223 | 3/1977 | Caywood | 549/321 |
| 4,033,889 | 7/1977 | Kiovsky | 508/234 |
| 4,049,382 | 9/1977 | Ross et al. | 23/230 R |
| 4,148,737 | 4/1979 | Liston et al. | |
| 4,148,739 | 4/1979 | Liston et al. | |
| 4,224,139 | 9/1980 | Schiff | 208/18 |
| 4,234,435 | 11/1980 | Meinhardt et al. | |
| 4,235,731 | 11/1980 | Kiovsky | 508/234 |
| 4,320,019 | 3/1982 | Hayashi | 508/241 |
| 4,357,250 | 11/1982 | Hayashi | 508/241 |
| 4,433,157 | 2/1984 | Weill et al. | 549/255 |
| 4,505,834 | 3/1985 | Papay et al. | 508/241 |
| 4,517,104 | 5/1985 | Bloch et al. | |
| 4,557,847 | 12/1985 | Gutierrez et al. | 508/241 |
| 4,566,983 | 1/1986 | Hayashi | 508/241 |
| 4,605,808 | 8/1986 | Samson | 585/525 |
| 4,613,341 | 9/1986 | Zaweski et al. | |
| 4,615,806 | 10/1986 | Hilton | 210/690 |
| 4,693,838 | 9/1987 | Varna et al. | 508/241 |
| 4,943,671 | 7/1990 | Dockner et al. | 585/642 |
| 4,981,602 | 1/1991 | Ripple et al. | 252/32.7 E |
| 4,997,594 | 3/1991 | Walsh | |
| 5,041,622 | 8/1991 | LeSuer | 560/190 |
| 5,057,207 | 10/1991 | Basler | 208/262.1 |
| 5,112,508 | 5/1992 | DeRosa et al. | 508/241 |
| 5,141,629 | 8/1992 | Pri-Bai et al. | 208/262.1 |
| 5,177,288 | 1/1993 | Chen | 585/522 |
| 5,182,037 | 1/1993 | Pialet et al. | |
| 5,185,488 | 2/1993 | Hawari et al. | 585/469 |
| 5,188,745 | 2/1993 | Migdal et al. | 508/241 |
| 5,202,036 | 4/1993 | Ripple et al. | |
| 5,221,491 | 6/1993 | Roper et al. | |
| 5,225,093 | 7/1993 | Campbell et al. | |
| 5,230,834 | 7/1993 | Gutierrez et al. | |
| 5,241,003 | 8/1993 | Degonia et al. | 525/123 |
| 5,252,238 | 10/1993 | Chung et al. | |
| 5,266,223 | 11/1993 | Song et al. | 508/241 |
| 5,275,747 | 1/1994 | Gutierrez et al. | 508/241 |
| 5,277,833 | 1/1994 | Song et al. | 508/468 |
| 5,314,614 | 5/1994 | Moser et al. | 208/262.1 |
| 5,382,736 | 1/1995 | Baghel et al. | 585/469 |
| 5,410,088 | 4/1995 | Harris et al. | 568/21 |
| 5,429,757 | 7/1995 | Mishra et al. | 508/241 |
| 5,474,694 | 12/1995 | Shirodkar et al. | 508/466 |

FOREIGN PATENT DOCUMENTS

| | | |
|---|---|---|
| 793825 | 9/1968 | Canada . |
| 1034586 | 7/1978 | Canada . |
| 0064924 | 11/1982 | European Pat. Off. . |
| 0382450 | 8/1990 | European Pat. Off. . |
| 0355895 | 12/1994 | European Pat. Off. . |
| 0665242 | 8/1995 | European Pat. Off. . |
| 2273014 | 12/1975 | France . |
| 1440219 | 6/1976 | United Kingdom . |
| 1480453 | 7/1977 | United Kingdom . |
| 9321117 | 10/1993 | WIPO . |

OTHER PUBLICATIONS

Stecher et al, Merck Index, 8th Ed., 1968, p.1164.
BASF technical information brochure on "GLISSOPAL CE5203" dated Aug. 1984.

*Primary Examiner*—Prince Willis, Jr.
*Assistant Examiner*—Cephia D. Toomer
*Attorney, Agent, or Firm*—William J. Connors; Frederick D. Hunter

[57] ABSTRACT

This invention relates to compositions which are useful as additives in lubricants and fuels, and more particularly, to additives which are chlorine-free or contain only minor amounts of chlorine. More particularly, carboxylic compositions are described which are prepared by reacting a terpolymer derived from a mixture of monomers comprising ethylene, an alpha-olefin containing 3 to about 20 carbon atoms, and a non-conjugated polyene with an alpha,beta-monounsaturated dicarboxylic acid or reactive derivative thereof. These carboxylic compositions may be used in lubricating oil or fuel compositions or may be used to form carboxylic derivative compositions which are useful in lubricating oil and fuel compositions. Such useful carboxylic derivative compositions can be prepared by reacting at least one of the above-described carboxylic compositions with a reactant selected from the group consisting of (A) amines characterized by the presence within their structure of at least one H—N< group, (B) alcohols, (C) reactive metal or reactive metal compounds, and (D) a combination of two or more of any one of (A) through (C), the components of (D) being reacted with one or more of the carboxylic compositions simultaneously or sequentially in any order. In another embodiment, the carboxylic composition may be prepared by reacting a mixture of an alpha-olefin polymer, the above-described terpolymer, and an alpha,beta-monounsaturated dicarboxylic acid or reactive derivative thereof.

76 Claims, No Drawings

CARBOXYLIC COMPOSITIONS, DERIVATIVES, LUBRICANTS, FUELS AND CONCENTRATES

FIELD OF THE INVENTION

This invention relates to substituted carboxylic acid compositions and carboxylic acid derivative compositions. The invention has particular utility of preparing compounds for the lubricant and fuel industries.

BACKGROUND OF THE INVENTION

Carboxylic acids substituted with substantially aliphatic substituents derived from polymerization of lower olefins have been described in the prior art and have many important industrial uses. For example, such carboxylic acids can be used as anti-rust agents in various organic media such as normally liquid fuels and lubricating oils. They can also serve as intermediates for the formation of metal salts, esters, and nitrogen-containing products which are useful as viscosity index improvers, dispersants, etc., for oil-base lubricants and normally liquid fuels.

Such carboxylic acids can be prepared by thermally reacting an aliphatic hydrocarbon or halogenated aliphatic hydrocarbon with unsaturated acids or acid derivatives at temperatures above about 200° C. A hydrocarbon typically is an olefin polymer such as polypropene or polybutene having number average molecular weights generally above 200. The rate of conversion of such reactions, however, is low and attempts to improve the conversion rate by increasing the reaction temperature and/or using super-atmospheric pressure results in degradation of maleic anhydride to carbon dioxide, water and tarry solids. One technique which has been used for improving the conversion rate, particularly when using aliphatic hydrocarbon alkylating agents, involves carrying out the reaction in the presence of chlorine. In some instances, high temperatures and long reaction times still are required. Examples of U.S. patents which describe methods for preparing hydrocarbyl-substituted aliphatic carboxylic acids, and particularly dicarboxylic acids utilizing various amounts of chlorine include U.S. Pat. Nos. 3,215,707 (Rense); 3,231,587 (Rense); 3,912,764; 4,110, 349; 4,234,435 (Meinhardt); and 5,041,622 (LeSuer). U.S. Pat. No. 4,234,435 describes carboxylic derivative compositions produced by reacting at least one substituted succinic acylating agent with a reactant such as amines, alcohols, reactive metals or combinations thereof wherein the substituted succinic acylating agent consists of substituent groups and succinic groups and wherein the substituent groups are derived from a polyalkene having an $\overline{M}n$ value of about 1300 to about 5000 and an $\overline{M}w/\overline{M}n$ value of about 1.5 to about 4, and said acylating agents are characterized by the presence within their structure of an average of at least 1.3 succinic groups for each equivalent weight of substituent groups. Because of the presence of the excess of succinic groups in the acylating agents, such compounds have been referred to in the art as "over succinated," and the products described in the '435 patent have been characterized as detergents and viscosity improving additives in lubricating oil compositions. When such derivatives are incorporated into lubricating compositions, they impart sufficient fluidity modifying properties to the lubricant which are sufficient to permit elimination of all or a significant amount of viscosity index improver from multi-grade lubricant compositions containing the same.

As mentioned, the acylating agents utilized in preparing the lubricant additives described in U.S. Pat. No. 4,234,435 are prepared by reaction of an olefin polymer with an alpha,beta-unsaturated dicarboxylic acid such as maleic anhydride in the presence of chlorine. In such instances, the products which are obtained from the reaction and the products obtained from the subsequent reaction with amines, alcohols, metal compounds, etc., contain various amounts of halogen. Due to environmental concerns, it has now become desirable to eliminate or reduce the level of chlorine in products no matter how small the amount of chlorine initially. One potential solution to eliminating the chlorine contained in such lubricant and fuel additives is simply not to use chlorine in the manufacturing process. Another potential solution is to develop procedures for treating such compositions to remove the chlorine which is present. One procedure for treating various chlorine-containing organic compounds to reduce the level of chlorine therein has been described in a European patent application published under Publication No. 665,242. The procedure described therein for reducing the chlorine content of organochlorine compounds comprises introducing a source of iodine or bromine into the organochlorine compound and contacting the components of the resulting mixture for a sufficient amount of time to reduce the chlorine content without substantially incorporating iodine or bromine into the organochlorine compound. This procedure is successful in reducing the chlorine content of organochlorine compounds, but in some instances, it is desirable to even further reduce the amount of chlorine in additive compositions which are to be utilized in lubricants and fuels.

As mentioned above, one technique for reducing the amount of chlorine in additive compositions based on hydrocarbon-substituted dicarboxylic acids is to prepare such hydrocarbon-substituted dicarboxylic acids in the absence of chlorine, and procedures have been described for preparing such compounds by the "thermal" process in which the polyolefin and the unsaturated dicarboxylic acid are heated together, optionally in the presence of a catalyst. However, when this procedure is used, it is more difficult to incorporate an excess of the succinic groups into the hydrocarbon-substituted succinic acylating agent, and dispersants prepared from such acylating agents do not exhibit sufficient viscosity index improving characteristics.

It has been proposed in the art that ashless dispersants can be prepared with succinic to polyolefin substituent ratios in excess of 1.3:1 by the thermal process when the polyolefin contains a large amount, such as at least about 70%, of the terminal groupings in a structure having an alpha-olefinic bond and/or structures capable of isomerizing to such alpha-olefinic structures. Such procedures are described in published European Patent Application 355 895 and BASF technical information brochure on "Glissopal CE 5203" dated 08/84. Reactive polyisobutenes having at least 70% of their unsaturation in a terminal position are described in U.S. Pat. No. 4,605,808. The process described in this published application uses a complex of boron trifluoride and alcohol as catalyst, and a contact time of at least 8 minutes.

SUMMARY OF THE INVENTION

This invention relates to compositions which are useful as additives in lubricants and fuels, and more particularly, to additives which are chlorine-free or contain only minor amounts of chlorine. More particularly, carboxylic compositions are described which are prepared by reacting a terpolymer derived from a mixture of monomers comprising ethylene, an alpha-olefin containing 3 to about 20 carbon atoms, and a non-conjugated polyene with an alpha,beta-monounsaturated dicarboxylic acid or reactive derivative thereof. These carboxylic compositions may be used in lubricating oil and fuel compositions or may be used to form carboxylic derivative compositions which are useful in lubricating oil and fuel compositions. Such useful carboxylic derivative compositions can be prepared by reacting at least one of the above-described carboxylic compositions with a reactant selected from the group consisting of (A) amines characterized by the presence within their structure of at least one H—N< group, (B) alcohols, (C) reactive metal or reactive metal compounds, and (D) a combination of two or more of any one of (A) through (C, the components of (D) being reacted with one or more of the carboxylic compositions simultaneously or sequentially in any order. In another embodiment, the carboxylic composition may be prepared by reacting a mixture of an alpha-olefin polymer, the above-described terpolymer, and an alpha,beta-monounsaturated dicarboxylic acid or reactive derivative thereof. These carboxylic compositions may be used in lubricants and fuels or reacted with amines, alcohols, etc., to form carboxylic derivative compositions which are useful as additives in lubricants and fuels. The carboxylic compositions of the present invention also may be prepared by preparing mixtures comprising (A) a first carboxylic composition prepared by reacting an alpha-olefin polymer with an alpha,beta-monounsaturated dicarboxylic acid or reactive derivative thereof, and (B) a second carboxylic composition prepared by reacting a terpolymer derived from a mixture of monomers comprising ethylene, an alpha-olefin containing from about 3 to about 20 carbon atoms, and a non-conjugated polyene with an alpha,beta-monounsaturated dicarboxylic acid or reactive derivative thereof.

DETAILED DESCRIPTION OF THE INVENTION

In one embodiment of the present invention, carboxylic compositions are prepared by reacting a terpolymer derived from a mixture of monomers comprising ethylene, an alpha-olefin containing from about 3 to about 20 carbon atoms, and a non-conjugated polyene with an alpha,beta-monounsaturated dicarboxylic acid or reactive derivative thereof.

The terpolymers which are useful in preparing the carboxylic compositions are generally low molecular weight terpolymers such as those having number average molecular weights of from about 1000 to about 15,000, and more often from about 3000 to about 10,000, and most often from about 6000 to about 9000. The terpolymers are often referred to as EPDM polymers since the alpha-olefin component containing from about 3 to about 20 carbon atoms is generally propylene. The alpha-olefin containing from about 3 to about 20 carbon atoms can be represented by the formula $$RCH=CH_2$$

wherein R is a linear or branched chain alkyl group containing from 1 to about 10 carbon atoms. Examples of such alpha-olefins include, in addition to 1-propene, 1-butene, 1-pentene, 1-hexene, etc.

The third component utilized in the preparation of the terpolymers is at least one non-conjugated polyene including aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, and bicyclic dienes such as exo- and endo-dicyclopentadiene and the like; exo- and endo-alkenyl norbornenes, such as 5-propenyl-, 5-(butene-2-yl)-, and 5-(2-methylbuten-[2']-yl) norbornene and the like; alkyl alkenyl norbornenes such as 5-methyl-6-propenyl norbornene and the like; alkylidene norbornenes such as 5-methylene-2-norbornene; 5-ethylidene-2-norbornene, 5-iso-propylidene-2-norbornene, vinyl norbornene, cyclohexenyl norbornene and the like; alkyl norbornodienes such as methyl-, ethyl-, and propyl norbornodiene; and cyclodienes such as 1,5-cyclooctadiene, 1,4-cyclooctadiene, etc. Preferred non-conjugated polyenes are the non-conjugated dienes which may be aliphatic dienes and bicyclic dienes. In a more preferred embodiment, the dienes may be dicyclopentadiene, and 5-ethylidene-2-norbornene.

The ethylene content of the ethylene/alpha-olefin/non-conjugated polyene terpolymers is generally between about 25% and about 85%, preferably from about 30% to about 75% and most preferably from about 40% to about 70% by weight. The polyene content of said terpolymers is generally below about 25% and is preferably between about 2% and about 20%, and more preferably from about 1% to about 15% by weight.

The ethylene/alpha-olefin/non-conjugated polyene terpolymers may be prepared by techniques well known to those skilled in the art, and such terpolymers are commercially available. For example, useful terpolymers are those marketed by Uniroyal Chemical Company, Inc., Middlebury, Conn., under the general trade designation Trilene. In particular, the terpolymers identified as Trilene 67 and Trilene 68 are terpolymers of ethylene, propylene and ethylidene norbornene (ENB), and Trilene 55 and Trilene 65 are terpolymers of ethylene, propylene and dicyclopentadiene monomer. Some characteristics of Trilene 67 and Trilene 68 are summarized in the following Table I.

TABLE I

|  | Trilene 67 | Trilene 68 |
|---|---|---|
| Iodine Number | 19 | 6 |
| Et/Pr/ENB (wt) | 46/54/9.5 | 45/55/3 |
| MW - visc. avg. | 7500 | 8000 |
| Avg. double bonds/molecule | 5.6 | 1.9 |

The alpha,beta-monounsaturated dicarboxylic acid or reactive derivative thereof which is reacted with the above-described terpolymers may be characterized by the formula $$XC(O)-Z-C(O)X'$$

wherein X and X' are each independently selected from the group consisting of OH, O-lower alkyl, a halogen atom, or taken together are a single oxygen atom, and Z is an alkenylene group. In one preferred embodiment, Z is —CH=CH—. Examples of such dicarboxylic acids include maleic acid and fumaric acid and derivatives thereof. The X and X' groups may be the same or different provided that at least one of X and X' is such that the product obtained from the reaction of the terpolymer with the dicarboxylic acid or derivative can function as a carboxylic acylating agent. That is, at least one of X and X' must be such that the substituted carboxylic compound can form amides or amine salt with amino compounds and otherwise function as conventional carboxylic acylating agents. Thus, X and/or X' may be —OH, —O-hydrocarbyl, —O—M⁺ where M⁺ represents one equivalent of a metal, ammonium or amine cation, —NH₂, —Cl, —Br, or taken together, X and X' can be —O— so as to form an anhydride.

Because of the high reactivity of the terpolymer, the reaction between the terpolymer and the alpha,beta-monounsaturated dicarboxylic acid can be effected by heating the mixture in the absence of catalysts. The reaction proceeds readily at temperatures between about 125° C. and up to but not including the decomposition temperature of the resultant carboxylic composition. More often the reaction is conducted at a temperature in the range of about 125° C. to about 225° or even 250° C. Higher temperature can be used when the reaction is conducted in an autoclave. High yields of the carboxylic composition can be obtained, and no chlorine is required to catalyze the reaction. Thus, these carboxylic compositions can be prepared free of chlorine. Alternatively, chlorine may be used to catalyze the reaction in instances where the terpolymers are not very reactive or when the presence of chlorine in the carboxylic composition product can be tolerated or is desirable for a particular end use.

In another embodiment, the carboxylic compositions of the present invention may be prepared by reacting a mixture which comprises (A) an alpha-olefin polymer;

(B) a low molecular weight terpolymer derived from a mixture of monomers comprising ethylene, an alpha-olefin containing from 3 to about 20 carbon atoms, and a non-conjugated polyene; and (C) an alpha, beta-monounsaturated dicarboxylic acid or reactive derivative thereof.

These reactions can be accomplished by heating the mixture at a temperature of from about 125° C. up to but not including the decomposition temperature of the carboxylic composition product. More often the reaction is conducted at a temperature in the range of about 125° C. to about 225° or even 250° C. Higher temperature can be used when the reaction is conducted in an autoclave. No catalysts are required to promote these reactions and thus, such carboxylic compositions can be prepared containing no chlorine.

The alpha-olefin polymers (A) which are utilized in preparing the above-described carboxylic compositions generally are derived from olefins containing from about 2 to about 20 carbon atoms, and more preferably from olefins containing from 2 to about 4 carbon atoms such as polymers of ethylene, 1-propene, 1-butene and isobutene. In some instances, the alpha-olefin polymer may contain hetero atoms such as chlorine which may be present as an impurity in the olefin or may be present as the result of a reaction between chlorine and the alpha-olefin polymer. In one embodiment, the alpha-olefin polymer (A) is a polymer or copolymer of an alpha-olefin characterized by the formula $$R-R^1C=CH_2$$

wherein R is a linear or branched chain alkyl group containing 1 to about 10 carbon atoms and $R^1$ is hydrogen or a lower alkyl group containing from 1 to about 5 or 6 carbon atoms. Examples of alpha-olefins wherein $R^1$ is hydrogen include ethylene, 1-propene, 1-butene, 1-pentene, etc., and an example of an olefin wherein $R^1$ is a lower alkyl group (i.e., methyl) is isobutene.

The alpha-olefin polymer (A) generally will have a number average molecular weight $\overline{Mn}$ of from about 300 to about 10,000, and more often an $\overline{Mn}$ of from about 800 to about 4000.

In one preferred embodiment, at least about 30% of the unsaturation in the alpha-olefin polymer (A) is in the terminal position. By way of illustration, the terminal groupings in polyisobutylene (polyisobutene) are represented as $$\text{CHAIN-CH}_2-\underset{\underset{CH_3}{|}}{C}=CH_2$$

wherein CHAIN represents the polymer chain. These types of alpha-olefin polymers also have been described as having a vinylidene-type terminal unsaturation. A structure which can be considered to be capable of isomerizing to the above-described alpha-olefin structure is a beta-olefin structure which can be represented as $$\text{CHAIN-CH}=C-(CH_3)_2$$

Alpha-olefin or high vinylidene polymers can be readily prepared employing metallocene catalysts as known in the art and described in, for example, U.S. Pat. No. 4,668,834 (Rim et al). Other patents describing high vinylidene polymers include U.S. Pat. Nos. 4,152,499 (Boerzel et al); 4,605,808 (Samson); 4,849,527 (Dennis et al); 5,068,490 (Eaton); and 5,286,823 (Rath).

In one embodiment, the alpha-olefin polymers used in the present invention contain terminal unsaturation wherein at least about 30% of the terminal groupings are in a structure having an alpha-olefinic bond (vinylidene) or are structures capable of isomerizing to such alpha-olefinic structure. In other embodiments, at least 50% or 70% or even 80% of the terminal groupings are in the structure having an alpha-olefinic bond and/or structures capable of isomerizing to such alpha-olefinic structures.

The relative amounts of the (A) alpha-olefin polymer; (B) low molecular weight terpolymer; and (C) alpha,beta-monounsaturated dicarboxylic acid or reactive derivative thereof contained in the mixture used to form the carboxylic compositions of the present invention may vary over a wide range. In one embodiment, the mixture comprises from about 60 parts to about 99.5 parts by weight of (A), from about 0.5 parts to about 40 parts by weight of (B), and from about 2 parts to about 60 parts by weight of (C) per 100 parts by weight of the combination of (A) and (B). In other embodiments, the mixtures may comprise from about 75 parts to about 99.5 parts by weight of (A), from about 0.5 parts to about 25 parts by weight of (B), and from about 3 parts to about 50 parts by weight of (C), per 100 parts by weight of the combination of (A) and (B).

In another embodiment the carboxylic compositions of the present invention comprise a mixture of hydrocarbon-substituted carboxylic compositions wherein at least one of the carboxylic compositions is prepared by reacting the terpolymer described above with an alpha,beta-monounsaturated dicarboxylic acid or reactive derivative thereof. Thus, the carboxylic compositions of the invention may comprise a mixture of (A) a first carboxylic composition prepared by reacting an alpha-olefin polymer with an alpha,beta-monounsaturated dicarboxylic acid or reactive derivative thereof, and (B) a second carboxylic composition prepared by reacting a terpolymer derived from a mixture of monomers comprising ethylene, an alpha-olefin containing from about 3 to about 20 carbon atoms, and a non-conjugated polyene with an alpha,beta-monounsaturated dicarboxylic acid or reactive derivative thereof. The mixtures may contain one or more of the first carboxylic compositions and one or more of the second carboxylic compositions. The second carboxylic composition (B) has been described in detail above.

The first carboxylic composition present in the mixtures are prepared by reacting an alpha-olefin polymer with an alpha,beta-monounsaturated dicarboxylic acid or reactive derivative thereof. The alpha-olefin polymers or polyalkenes which are reacted with the monounsaturated dicarboxylic acid may be any of the alpha-olefin polymers described above including the high vinylidene polymers. Thus, the alpha-olefin polymer may be a polymer or copolymer of an alpha-olefin characterized by the formula $$R-R^1C=CH_2$$

wherein R is hydrogen or a linear or branched chain alkyl group containing 1 to about 10 carbon atoms, and $R^1$ is hydrogen or a lower alkyl group. Preferably, the alpha-olefin polymer will contain from 2 to 4 carbon atoms, and examples of such olefins include ethylene, 1-propene, 1-butene, and isobutene. The alpha-olefin polymers may have number average molecular weights of from about 300 to about 10,000 and more often will have number average molecular weights of from about 800 to about 4000. In one embodiment, it is preferred that at least about 30% of the unsaturation in the alpha-olefin polymers is in the terminal position.

In one preferred embodiment, the alpha,beta-monounsaturated dicarboxylic acid or reactive derivative thereof is maleic acid or anhydride or fumaric acid, or derivatives thereof, and the resulting product is a substituted succinic acid, anhydride or derivatives thereof. For convenience, the first carboxylic composition may be referred to herein as a polyalkylene succinic acid or anhydride or a substituted carboxylic or succinic acylating agent although other anhydrides and acylating agents prepared by reacting alpha-olefin polymer with an alpha,beta-mono unsaturated dicarboxylic acid by reactive derivative thereof are useful in the present invention.

In another preferred embodiment, the first carboxylic composition is a polyalkylene succinic anhydride and more particularly, a polyisobutenyl anhydride wherein the polyalkylene or polyisobutenyl substituent is derived from an alpha-olefin having an Mn value of from about 1300 to about 5000, and an Mw/Mn value of about 1.5 to about 4. The succinic acid or anhydride is further characterized as having within its structure at least 1.3 of the dibasic carboxylic groups for each equivalent weight of the groups derived from the polyalkylene (polyisobutylene). These preferred carboxylic compounds are described in detail in U.S. Pat. No. 4,234,435 (Meinhardt and Davis), and the entire text of the '435 patent is incorporated by reference.

The first carboxylic composition useful in the present invention can be prepared by a thermal process or a thermal process promoted by a halogen such as chlorine. As noted previously, the presence of chlorine results in a reduced reaction time and a more efficient polyolefin utilization. The alternative thermal process is one in which the polyolefin and the anhydride are heated together, optionally in the presence of a catalyst. This process avoids or minimizes chlorine residues (except for those present as impurities in the reactants and the catalysts, if used), but the reaction tends to be slower and results in a lower conversion of polyolefin. It is also difficult to prepare polyolefin-succinic derivatives in which the molecular proportion of the succinic component is insignificant excess unless the more reactive, high vinylidene olefin polymers are utilized as the olefin reactant. A variety of methods for preparing hydrocarbon substituted succinic acylating agents have been described in the prior art. One method of preparing a succinic acylating agent is conveniently designated as the "two-step procedure" and is described in, for example, U.S. Pat. No. 3,219,666 (Norman et al). It involves first chlorinating the polyalkene until there is an average of at least about one chloro group for each molecular weight of polyalkene. (For purposes of this discussion, the molecular weight of the alkene is the weight corresponding to the Mn value.) Chlorination involves merely contacting the polyalkene with chlorine gas until the desired amount of chlorine is incorporated into the chlorinated polyalkene. Chlorination is generally carried out at temperatures of about 75° C. to about 125° C. If a diluent is used in the chlorination procedure, it should be one which is not itself readily subject to further chlorination. Poly- and perchlorinated and/or fluorinated alkyl benzenes are examples of suitable diluents.

The second step in the two-step chlorination procedure is to react the chlorinated polyalkene with the maleic reactant at a temperature usually within the range of about 100° C. to about 200° C. The mole ratio of chlorinated polyalkene to maleic reactant is usually about 1:1. (For purposes of making the two-step chlorinated product, a mole of chlorinated polyalkene is that weight of chlorinated polyalkene corresponding to the Mn value of the unchlorinated polyalkene.) However, a stoichiometric excess of maleic reactant can be used, for example, a mole ratio of 1:2.

If an average of more than about one chloro group per molecule of polyalkene is introduced during the chlorination step, then more than one mole of maleic reactant can react per molecule of chlorinated polyalkene. Because of such situations, it is better to describe the ratio of chlorinated polyalkene to maleic reactant in terms of equivalents. (An equivalent weight of chlorinated polyalkene, for the preparation of a two-step chlorinated product, is the weight corresponding to the Mn value divided by the average number of chloro groups per molecule of chlorinated polyalkene while the equivalent weight of the maleic reactant is its molecular weight.)

Thus, the ratio of chlorinated polyalkene to maleic reactant for each mole of chlorinated polyalkene up to about one equivalent of maleic reactant for each equivalent of chlorinated polyalkene with the understanding that it is normally desirable to provide an excess of maleic reactant; or example, an excess of about 5% to about 25% by weight. Unreacted excess maleic reactant may be stripped from the reaction product, usually under vacuum, or reacted during a further stage of the process as explained below.

The resulting polyalkenyl-substituted succinic acylating agent is, optionally, again chlorinated if the desired number of succinic groups are not present in the product. If there is present, at the time of this subsequent chlorination, any excess maleic reactant from the second step, the excess will react as additional chlorine is introduced during the subsequent chlorination. Otherwise, additional maleic reactant is introduced during and/or subsequent to the additional chlorination step. This technique can be repeated until the total number of succinic groups per equivalent weight of substituent groups reaches the desired level.

Another procedure for preparing substituted succinic acid acylating agents utilizes a process described in U.S. Pat. No. 3,912,764 (Palmer et al) which is expressly incorporate hereby by reference for its teaching in regard to that process. According to that process, the polyalkene and the maleic reactant are first reacted by heating them together in a "direct alkylation" procedure. When the direct alkylation step is completed, chlorine is introduced into the reaction mixture to promote reaction of the remaining maleic reactants. According to the patent, 0.3 to 2 or more moles of maleic anhydride are used in the reaction for each mole of olefin polymer; i.e., polyalkene. The direct alkylation step is conducted at temperatures of 180° C. to 250° C. During the chlorine-introducing stage, a temperature of 160° C. to 225°

C. is employed. In utilizing this process to prepare the substituted succinic acylating agents useful herein, it would be necessary to use sufficient maleic reactant and chlorine to incorporate at least 1.3 succinic groups into the final product for each equivalent weight of groups derived from the polyalkene.

A further method of preparing a succinic acylating agent is disclosed in U.S. Pat. No. 3,231,587 (Rense) which is herein incorporated specifically by reference. This process, known as the "one step" process, and comprises preparing a mixture of an olefin polymer and maleic anhydride, and contacting said mixture at a temperature above about 140° C. with at least about one mole of chlorine for each mole of maleic anhydride. The product of the above process, as indicated before, is a hydrocarbon-substituted succinic anhydride, but it is not yet established whether the hydrocarbon group is a saturated group or one having olefinic linkages. The mechanism by which the product is formed is likewise not known. It is known, however, that the process is different from one in which the olefin polymer is first chlorinated and the chlorinated polymer is then allowed to react with maleic anhydride under similar reaction conditions. The two-step process requires a considerably lengthier reaction time and results in products which are much darker in color. Also, if the olefin polymer is to be chlorinated first, the chlorination temperature should not be allowed to exceed 120° C. Higher temperatures are known to cause dechlorination and thus result in products having little or no chlorine.

To carry out the process, it is preferred that the chlorine be introduced into the reaction zone after the olefin polymer has been thoroughly mixed with maleic anhydride. If the chlorine is allowed to come into contact with the olefin polymer prior to the introduction of maleic anhydride, chlorination of the polymer will take place and the advantageous results will not be obtained. The rate of introduction of the chlorine is not critical. Ordinarily, for maximum utilization of the chlorine used, the rate should be about the same as the rate of consumption of chlorine in this reaction.

The minimum temperature at which the reaction of the above process takes place at a reasonable rate is about 100° C.; hence, the minimum temperature at which the process should be carried out is in the neighborhood of 140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in this process requires approximately equimolar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect.

Other procedures for preparing the substituted succinic acylating agents also are described in the prior art and may be used to prepare the first carboxylic compositions useful in the present invention. For example, U.S. Pat. No. 4,110,439 (Cohen) describes another version of the two-step process, and U.S. Pat. No. 5,041,622 (LeSuer) describes a three-step process.

The first carboxylic compositions or the polyalkenyl-substituted succinic acylating agents which are prepared utilizing chlorine will contain varying amounts of chlorine in the reaction product. In some instances, it may be desirable to reduce the amount of chlorine present in the carboxylic composition before it is utilized as an oil additive or utilized as an intermediate in the formation of the carboxylic derivative compositions described below. One method for reducing the chlorine content of the carboxylic compositions is described in published European Patent Application 665 242 A1. In the method described in this publication, the chlorine content of chlorine-containing compounds can be reduced by a process which comprises introducing into the composition, a source of iodine or bromine, and thereafter contacting the resultant mixture for a sufficient amount of time to reduce the chlorine content to the desired level. In general, the source of iodine or bromine is contacted with the chlorine-containing compound at a temperature of from −50° C. to 300° C., more preferably from a temperature of about 140° C. to 220° C., and the chlorine is removed as a gas or a liquid. Removal of the chlorine can be assisted by blowing the reaction mixture with a gas such as nitrogen, by maintaining the reaction mixture at an elevated temperature, by distillation, by stripping, etc. Further details of the procedure for reducing the chlorine content of chlorine containing carboxylic compositions of the present invention are described in the published European patent application 665 242 A1.

When the carboxylic compositions of the present invention comprise a mixture of (A) a first carboxylic composition and (B) a second carboxylic composition as described above, such mixtures may contain various amounts of two or more carboxylic compositions. Generally, such mixtures will comprise from about 60 parts to about 99.5 parts by weight of the first carboxylic composition (A) and from about 0.5 parts to about 40 parts by weight of the second carboxylic composition (B). More often, such mixtures will contain from about 0.5 to about 10 or 25% by weight of the second carboxylic composition (B).

In yet additional embodiments, the mixtures of carboxylic compositions can be prepared by either of the following procedures: (1) one or more α-olefins are reacted with an α,β-dicarboxylic and/or anhydride to form an alkenyl-substituted dicarboxylic acid, and one or more of the above-described terpolymers and an α,β-dicarboxylic acid or anhydride are added and reacted in the presence of the alkenyl-substituted α,β-dicarboxylic acid or anhydride; or (2) one or more of the above-described terpolymers are reacted with an α,β-unsaturated dicarboxylic acid to form a terpolymer-substituted dicarboxylic acid, and one or more α-olefins and an α,β-dicarboxylic acids or anhydrides are added and reacted in the presence of the terpolymer-substituted α,β-dicarboxylic acid or anhydride.

The following Examples 1–13 illustrate the carboxylic compositions of the invention and the preparation of such compositions. Unless otherwise indicated in the following examples and elsewhere in the specification and claims, all parts and percentages are by weight, temperatures are in degrees Centigrade, and pressure is at or near atmospheric pressure.

EXAMPLE 1

A mixture of 600 parts (0.44 equivalent based on iodine number) of Trilene 67, 100 parts (1.02 moles) of maleic anhydride and 300 parts of mineral oil is heated to 200° C. under an atmosphere of nitrogen. The mixture is maintained at this temperature for 12 hours and thereafter stripped under vacuum for 1 hour at 190° C. A filter aid is added followed by 300 parts of oil, and the mixture is filtered through a cloth. The filtrate is the desired product (48.6% oil) and the oil solution has a total acid number (TAN) of 32.

EXAMPLE 2

A mixture of 500 parts (0.37 equivalent) of Trilene 67, 73 parts (0.75 mole) of maleic anhydride, 0.4 part of phenothiazine and 4 drops of a silicone anti-foaming agent is heated to 200°–202° C. for 4 hours under an atmosphere of nitrogen. The mixture is then stripped under vacuum for 1 hour, and 794 parts of mineral oil followed by 80 parts of a filter aid are added to the mixture. The mixture is filtered and the filtrate is a 60% oil solution of the desired product. The oil solution has a TAN of 16.4 (equivalent to 41, oil-free).

EXAMPLE 3

A mixture of 950 parts of a polyisobutylene having a number average molecular weight of about 1000, 95 parts of Trilene 67, 200 parts of maleic anhydride and 1 parts of phenothiazine is prepared and heated to 195°–198° C. for 12 hours under an atmosphere of nitrogen. The mixture is then stripped at 180°–190° C. for 1 hour. Mineral oil (197 parts) is added followed by 80 parts of filter aid and the mixture is then filtered. The filtrate (15% oil) is the desired product and having a TAN of 60.

EXAMPLE 4

A mixture of 1000 parts of a polyisobutylene having a number average molecular weight of 1000, 100 parts of Trilene 67, and 200 parts of maleic anhydride is heated to 195°–198° C. under an atmosphere of nitrogen for 12 hours. The material is then stripped under vacuum at 180°–190° C. for 1 hour whereupon 197 parts of mineral oil and 80 parts of a filter aid are added. The mixture is filtered and the filtrate (15% oil) is the desired product and having a TAN of 58.

EXAMPLE 5

A mixture of 1000 parts of a polyisobutylene having a number average molecular weight of about 1000, 50 parts of Trilene 67, 202 parts of maleic anhydride, and 1 part of phenothiazine is heated to 198°–202° C. for 12 hours. The mixture is stripped at 185°–190° C., and filter aid is added. This mixture is filtered, and the filtrate is the desired product having a TAN of 71.4.

EXAMPLE 6

A mixture of 1200 parts of a polyisobutylene having a number average molecular weight of about 2000, 60 parts of Trilene 67, 3 drops of a silicone anti-foam, 1.2 parts of phenothiazine and 180 parts of maleic anhydride is heated to 198°–202° C. for 12 hours under an atmosphere of nitrogen. The mixture is then stripped at 180°–190° C. whereupon 326 parts of mineral oil and 80 parts of a filter aid are added. This mixture is filtered, and the filtrate (20% oil) is the desired product having a TAN of 27.

EXAMPLE 7

A mixture of 750 parts of a polyisobutylene having a number average molecular weight of 1300, 75 parts of Trilene 67, 121 parts of maleic anhydride and 3 drops of a silicone anti-foam agent is heated to 203° C. for 24 hours. The mixture is stripped at 190° C. for 2 hours under vacuum. Mineral oil (165 parts) is added followed by a filter aid. This mixture is filtered, and the filtrate (20% oil) is the desired product.

EXAMPLE 8

A mixture of 600 parts (0.30 equivalent) of a polyisobutylene having a number average molecular weight of about 2000, 60 parts (0.045 equivalent) of Trilene 67 and 101 parts of a maleic anhydride is heated to 200° C. for 18 hours under an atmosphere of nitrogen. The mixture is then stripped for 3 hours at 195° C. and cooled. The residue is the desired product.

EXAMPLE 9

A mixture of 600 parts (0.60 equivalent) of a polyisobutylene having a number average molecular weight of about 1000, 60 parts (0.045 equivalent) of Trilene 67 and 126 parts (1.29 moles) of maleic anhydride is heated to 200° C. for 18 hours under an atmosphere of nitrogen. The mixture is stripped under vacuum for 2 hours at 190° C., and 70 parts of mineral oil are added followed by about 50 parts of a filter aid. The mixture is filtered. The filtrate (9.91% oil) is the desired product having a TAN of 73.

EXAMPLE 10

A mixture of 600 parts (0.30 equivalent) of a polyisobutylene having a number average molecular weight of about 2000, 60 parts (0.045 equivalent) of Trilene 67, 30 parts (0.073 mole) of a polypropenyl succinic acid wherein the polypropenyl group contains an average of 18 to 24 carbon atoms and 101 parts (1.04 moles) of maleic anhydride is heated to 200° C. for 18 hours under nitrogen atmosphere. The mixture then is stripped under vacuum for 2 hours at 190° C. and 140 parts of mineral oil are added. A filter aid is added to the mixture, and the mixture is filtered. The filtrate (16% oil) is the desired product having a TAN of 49.

EXAMPLE 11

A mixture of 100 parts of a polyisobutylene having a number average molecular weight of about 1300, 5 parts of Trilene 67 and an excess of maleic anhydride is heated to 200° C. for 18 hours. The product is stripped under vacuum, diluted with 20% oil and filtered. The filtrate is the desired product having a TAN of 42.3.

EXAMPLE 12

A mixture of 100 parts of a polyisobutylene having a number average molecular weight of about 1300 (Indopol H-300 from Amoco), 5 parts of Trilene 67 and an excess of maleic anhydride is heated to 200° C. for 18 hours, and the mixture is stripped under reduced pressure, diluted with 20% oil and filtered. The filtrate is the desired product having a TAN of 52.5.

EXAMPLE 13

The general procedure of Example 12 is repeated except that the ratio of the polyisobutylene to Trilene 67 is 10:1. The oil solution obtained in this manner (20% oil) has a TAN of 63.9.

The carboxylic compositions described above, including the mixtures of carboxylic compositions have utility in and of themselves as additives for lubricants and fuel compositions. For example, the carboxylic compositions can be used as fuel additives to reduce deposit formations for use in concentrations of from 50 to about 1000 ppm in hydrocarbon-based fuels. The carboxylic compositions also may be used in lubricant compositions where they function as dispersant-detergents. Accordingly, the present invention includes the use of the carboxylic compositions and concentrates of the compositions as additives in treating lubricants and fuels. Concentrates of the carboxylic compositions useful for formulating lubricating compositions in fuels generally will comprise from 20 to about 99% by weight of a normally liquid, substantially inert organic solvent/diluent and from about 1 to about 80% by weight of at least one of the carboxylic compositions described herein. When used in lubricating compositions, the lubricating compositions will comprise a major amount of an oil of lubricating viscosity and a minor amount of at least one of the carboxylic compositions described herein. When used in fuel compositions, the fuel compositions will comprise a major amount of a normally liquid fuel and a minor amount of at least one of the carboxylic compositions described herein.

Although the carboxylic compositions described above have utility in and of themselves, the principal use of the carboxylic compositions of the invention is as intermediates in preparing carboxylic derivative compositions. The carboxylic derivative compositions may be prepared by reacting one or more of the carboxylic compositions of the invention with a reactant selected from the group consisting of (a) amines characterized by the presence within their structure of at least one H—N< group, (b) alcohols, (c) reactive metals or reactive metal compounds, and (d) a combination of two or more of any of (a)-(c), the components of (d) being reacted with one or more of the carboxylic compositions simultaneously or sequentially in any order. Procedures for preparing esters, amides, imides, amine salts and metal salts from carboxylic compositions by such reactions are well known to those skilled in the art and are described in many patents. For example, reactions of carboxylic compounds such as substituted succinic acids and anhydrides with hydroxy compounds to form esters are described in U.S. Pat. Nos. 3,331,776; 3,381,022; 3,522,179; and 3,542,680; reactions with amines to form amides, imides and amine salts are described in U.S. Pat. Nos. 3,172,892; 3,219,666; and 3,272,746; and reactions with reactive metals to form metal salts are described in U.S. Pat. Nos. 3,271,310; 3,306,908; and Re 26,433. All of these patents are expressly incorporated herein by reference with disclosures of procedures for preparing such derivatives.

Accordingly, in one embodiment, carboxylic derivative compositions are prepared by reacting (A) at least one carboxylic composition prepared by reacting a terpolymer derived from a mixture of monomers derived from a mixture of monomers comprising ethylene, an alpha-olefin containing from about 3 to about 20 carbon atoms, and a non-conjugated diene with an alpha,beta-monounsaturated dicarboxylic acid or reacted derivative thereof with (B) a reactant selected from the group consisting of (a) amines characterized by the presence within their structure of at least one H—N<, (b) alcohols, (c) reactive metals or reactive metal compounds and (d) a combination of two or more of any of (a)-(c), the components of (d) being reacted with one or more of the carboxylic compositions (A) simultaneously or sequentially in any order.

In another embodiment, carboxylic derivative compositions can be prepared in accordance with the present invention by reacting (A) at least one carboxylic composition prepared by reacting a mixture comprising (1) an alpha-olefin polymer; (2) a low molecular weight terpolymer olefin derived from a mixture of monomers comprising ethylene, an alpha-olefin containing from about 3 to about 20 carbon atoms, and a non-conjugated polyene; and (3) an alpha,beta-monounsaturated dicarboxylic acid or reactive derivative thereof, with (B) a reactant selected from the group consisting of (a) amines characterized by the presence within their structure of at least one H—N<, (b) alcohols, (c) reactive metals or reactive metal compounds, and (d) a combination of two or more of any of (a)-(c), the components of (d) being reacted with one or more of the carboxylic compositions (A) simultaneously or sequentially in any order.

In yet another embodiment, carboxylic derivative compositions of the invention may be prepared by reacting a mixture of (A) a first carboxylic composition prepared by reacting an alpha-olefin polymer with an alpha,beta-monounsaturated dicarboxylic acid or reactive derivative thereof, (B) a second carboxylic composition prepared by reacting a terpolymer derived from a mixture of monomers comprising ethylene, an alpha-olefin containing from about 3 to about 20 carbon atoms, and a non-conjugated polyene with an alpha,beta-monounsaturated dicarboxylic acid or reactive derivative thereof, and (C) a reactant selected from the group consisting of (a) amines, (b) alcohols, (c) reactive metals or reactive metal compounds, and (d) a combination of two or more of any of (a)-(c), the components of (d) being reacted with one or more of the carboxylic compositions (A) and (B) simultaneously or sequentially in any order. Alternatively, the components of (C) can be reacted with the composition of one of (A) or (B to form an intermediate which is then reacted with the other of (B) or (A). For example, composition (A) can be reacted with composition (C) followed by reaction with composition (B), or composition (B) can be reacted with composition (C) followed by reaction with composition (A).

The above-described carboxylic compositions may be reacted with amines to form nitrogen-containing carboxylic derivatives of the present invention which are useful as dispersants in lubricants and fuels. The amines may be monoamines or polyamines, typically polyamines, preferably ethylene amines, amine bottoms or amine condensates. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated.

The monoamines generally contain from 1 to about 24 carbon atoms, preferably 1 to about 12, and more preferably 1 to about 6. Examples of monoamines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary amines include dimethylamine, diethylamine, dipropylamine, dibutylamine, dicyclopentylamine, dicyclohexylamine, methylbutylamine, ethylhexylamine, etc. Tertiary amines include trimethylamine, tributylamine, methyldiethylamine, ethyldibutylamine, etc.

In another embodiment, the amine may be a hydroxyamine. Typically, the hydroxyamines are primary, secondary or tertiary alkanol amines or mixtures thereof. Such amines can be represented by the formulae:

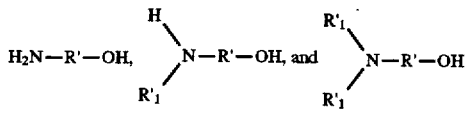

wherein each $R'_1$ is independently a hydrocarbyl group of 1 to about 8 carbon atoms or hydroxyhydrocarbyl group of 2 to about 8 carbon atoms, preferably 1 to about 4, and R' is a divalent hydrocarbyl group of about 2 to about 18 carbon atoms, preferably 2 to about 4. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two $R'_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R'_1$ is independently a methyl, ethyl, propyl, butyl, pentyl or hexyl group.

Examples of these alkanolamines include mono-, di-, and triethanol amine, diethylethanolamine, ethylethanolamine, butyldiethanolamine, etc.

The hydroxyamines can also be an ether N-(hydroxyhydrocarbyl)amine. These are hydroxypoly (hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with afore-described amines and can be represented by the formulae:

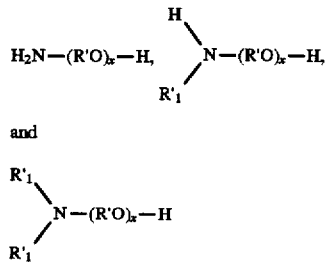

wherein x is a number from about 2 to about 15 and $R_1$ and R' are as described above. $R'_1$ may also be a hydroxypoly (hydrocarbyloxy) group.

Suitable amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae: $NH_2$-Alkylene (O-Alkylene)$_m$$NH_2$ wherein m has a value of about 3 to 70 and preferably about 10 to 35; and R(Alkylene (O-Alkylene)$_n$$NH_2$)$_{3-6}$, wherein n is from about 1 to 40 with the proviso that the sum of all of the n values is from about 3 to about 70 and generally from about 6 to about 35 and R is a polyvalent saturated hydrocarbon group of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The preferred polyoxyalkylene polyamines include the polyoxyethylene and polyoxypropylene diamines and the polyoxypropylene triamines having average molecular weights ranging from about 200 to 4000 or from about 400 to about 2000. The polyoxyalkylene polyamines are commercially available an may be obtained, for example, from the Texaco Oil Company, Inc. under the trade names "Jeffamines D-230, D-400, D-1000, D-2000, T-403, etc.".

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the carboxylic compositions of the present invention.

The nitrogen-containing carboxylic dispersant may be derived from a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

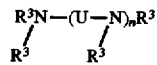

wherein n has an average value from 1 to about 10, preferably about 2 to about 7, more preferably about 2 to about 5, and U is an alkylene group having from 1 to about 10 carbon atoms, preferably about 2 to about 6, more preferably about 2 to about 4, each $R^3$ is independently a hydrogen atom, a hydrocarbyl group, or a hydroxy-substituted or amino-substituted hydrocarbyl group having up to about 30 carbon atoms, or two $R^3$ groups on different nitrogen atoms can be joined together to form a U group with the proviso that at least one $R^3$ group is a hydrogen atom.

Such alkylene polyamines include methylene polyamines, ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines are ethylene diamine, triethylene tetramine, tris-(2-amino-ethyl)amine, propylene diamine, trimethylene diamine, tripropylene tetramine, tetraethylene pentamine, hexaethylene heptamine, pentaethylenehexamine, etc.

Higher homologs obtained by condensing two or more of the above-noted alkylene amines are similarly useful as are mixtures of two or more of the afore-described polyamines.

Ethylene polyamines, such as those mentioned above, are useful. Such polyamines are described in detail under the heading Ethylene Amines in Kirk Othmer's "Encyclopedia of Chemical Technology", 4th Edition, Vol. 8, pages 74–108, Interscience Publishers, New York (1993). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the afore-described piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Texas designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylene hexamine and higher polyethylene amines (by weight). These alkylene polyamine bottoms include cyclic condensation products such as piperazine and higher analogs of diethylenetriamine, triethylenetetramine and the like. These alkylene polyamine bottoms can be reacted solely with the acylating agent or they can be used with other amines, polyamines, or mixtures thereof.

Another useful polyamine is obtained by a condensation reaction between at least one hydroxy compound with at least one polyamine reactant containing at least one primary or secondary amino group. The hydroxy compounds are preferably polyhydric alcohols and amines. The polyhydric alcohols are described below. In one embodiment, the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine, preferably tris(hydroxymethyl) aminomethane (THAM).

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 220° C. to about 250°C.) in the presence of an acid catalyst.

The amine condensates and methods of making the same are described, for example, U.S. Pat. No. 5,230,714 (Steckel) which is incorporated by reference for its disclosure to the condensates and methods of making. The preparation of such polyamine condensates may occur as follows: A 4-necked 3-liter round-bottomed flask equipped with glass stirrer, thermowell, subsurface $N_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris(hydroxymethyl)aminomethane (THAM). This mixture is heated to 60° C. and 23 grams of 85% $H_3PO_4$ is added. The mixture is then heated to 120° C. over 0.6 hour. With $N_2$ sweeping, the mixture is then heated to 150° C. over 1.25 hours, then to 235° C. over 1 hour more, then held at 230°–235° C. for 5 hours, then heated to 240° C. over 0.75 hour, and then held at 240°–245° C. for 5 hours. The product is cooled to 150° C. and filtered with a diatomaceous earth filter aid. Yield: 84% (1221 grams).

In another embodiment, the polyamines are hydroxy-containing polyamines. Hydroxy-containing polyamine analogs of hydroxy monoamines, particularly alkoxylated alkylenepolyamines (e.g., N,N(diethanol)ethylene diamine) can also be used. Such polyamines can be made by reacting the above-described alkylene amines with one or more of the above-described alkylene oxides. Similar alkylene oxide-alkanol amine reaction products can also be used such as the products made by reacting the afore-described primary, secondary or tertiary alkanol amines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl)ethylenediamine, N,N-bis(2-hydroxyethyl)-ethylene-diamine, 1-(2-hydroxyethyl) piperazine, mono(hydroxypropyl)-substituted tetraethylenepentamine, N-(3-hydroxybutyl)-tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the amine is a heterocyclic polyamine. The heterocyclic polyamines include aziridines, azetidines, azolidines, tetra- and dihydropyridines, pyrroles, indoles, piperidines, imidazoles, di- and tetra-hydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-2-hydroxyethyl)cyclohexylamine, 3-hydroxycyclopentylamine, parahydroxyaniline, N-hydroxyethylpiperazine, and the like.

Hydrazine and substituted-hydrazine can also be used to form nitrogen-containing carboxylic dispersants. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethyl-hydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di(parachlorophenol)-hydrazine, N-phenyl-N'-cyclohexylhydrazine, amino guanidine bicarbonate, and the like.

The carboxylic derivative compositions produced by reacting the carboxylic compositions of the invention and the amines described above are acylated amines which include amine salts, amides, imides and imidazolines as well as mixtures thereof. To prepare the carboxylic derivative compositions from the amines, one or more of the carboxylic compositions and one or more amines are heated, optionally in the presence of a normally liquid, substantially inert organic liquid solvent/diluent, at temperatures in the range of from about 80° C. up to the decomposition point of any of the reactants or the product, but normally at temperatures in the range of from about 100° C. up to about 300° C., provided 300° C. does not exceed the decomposition point. Temperatures of about 125° C. to about 250° C. are normally used. The carboxylic composition and the amine are reacted in an amount sufficient to provide from about one-half equivalent up to two moles of amine per equivalent of the carboxylic composition. In another embodiment, the carboxylic composition is reacted with from about one-half equivalent up to one mole of amine per equivalent of the carboxylic composition. For the purpose of this invention, an equivalent of amine is that amount of amine corresponding to the total weight of amine divided by the total number of nitrogens present. Thus, octyl amine has an equivalent weight equal to its molecular weight; ethylenediamine has an equivalent weight equal to one-half its molecular weight, and aminoethylpiperazine has an equivalent weight equal to one-third of its molecular weight.

Because the carboxylic compositions of this invention can be used in the same manner as the high molecular weight acylating agents of the prior art in preparing acylated amines suitable as additives for lubricating oil compositions, U.S. Pat. Nos. 3,172,892; 3,219,666; and 3,272,746 are expressly incorporated herein by reference for their disclosure with respect to the procedures applicable to reacting the carboxylic compositions (acylating reagents) of this invention with the amines as described above. In applying the disclosures of these patents to the carboxylic compositions of the present invention, the latter can be substituted for the high molecular weight carboxylic acid acylating agents disclosed in these patents on an equivalent basis.

Alcohols useful as (b) in preparing carboxylic derivative compositions of this invention from the carboxylic compositions (acylating reagents) previously described include those compounds of the general formula

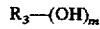

wherein $R_3$ is a monovalent or polyvalent organic radical joined to the —OH groups through carbon-to-oxygen bonds (that is,

wherein the carbon is not part of a carbonyl group) and m is an integer of from 1 to about 10, usually 2 to about 6. As with the amine reactant (a), the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for polyoxyalkylene alcohols, the mono- and polyhydric alcohols corresponding to the above formula will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating reagents of this invention. In general, polyhydric alcohols are preferred.

The monohydric and polyhydric alcohols useful as (b) include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkyl-mercapto, nitro and the like. Usually, the hydroxy aromatic compound will contain 1 to 4 hydroxy groups. The aromatic hydroxy compounds are illustrated by the following specific examples: phenol, p-chlorophenol, p-nitrophenol, beta-naphthol, alpha-naphthol, cresols, resorcinol, catechol, carvacrol, thymol, eugenol, p,p'-dihydroxybiphenyl, hydroquinone, pyrogallol, phloroglucinol, hexylresorcinol, orcin, guaicol, 2-chlorophenol, 2,4-dibutylphenol, propenetetramer-substituted phenol, didodecylphenol, 4,4'-methylene-bis-methylene-bis-phenol, alpha-decyl-beta-naphthol, polyisobutenyl-(molecular weight of about 1000)-substituted phenol, the condensation product of heptylphenol with 0.5 mole of formaldehyde, the condensation product of octylphenol with acetone, di(hydroxyphenyl)oxide, di(hydroxyphenyl)sulfide, di(hydroxyphenyl)disulfide, and 4-cyclohexylphenol. Phenol itself and aliphatic hydrocarbon-substituted phenols, e.g., alkylated phenols having up to 3 aliphatic hydrocarbon substituents are especially preferred. Each of the aliphatic hydrocarbon substituents may contain 100 or more carbon atoms but usually will have from 1 to 20 carbon atoms. Alkyl and alkenyl groups are the preferred aliphatic hydrocarbon substituents.

Further specific examples of monohydric alcohols which can be used as (b) include monohydric alcohols such as methanol, ethanol, isooctanol, dodecanol, cyclohexanol, cyclopentanol, behenyl alcohol, hexatriacontanol, neopentyl alcohol, isobutyl alcohol, benzyl alcohol, beta-phenethyl alcohol, 2,-methylcyclohexanol, beta-chloroethanol, monomethyl ether of ethylene blycol, monobutyl ether of ethylene glycol, monopropyl ether of diethylene glycol, monododecyl ethyl of triethylene glycol, monooleate of ethylene glycol, monostearate of diethylene glycol, sec-pentyl alcohol, tert-butyl alcohol, 5-bromo-dodecanol, nitro-octadecanol, and dioleate of glycerol. Alcohols within (b) may be unsaturated alcohols such as allyl alcohol, cinnamyl alcohol, 1-cyclohexene-3-ol and oleyl alcohol.

Other specific alcohols useful as (b) are the ether alcohols and amino alcohols including, for example, the oxyalkylene-, oxy-arylene-, amino-alkylene-, and aminoarylene-substituted alcohols having one or more oxyalkylene, aminoalkylene or amino-aryleneoxy-arylene groups. They are exemplified by Cellosolve, carbitol, phenoxyethanol, heptylphenyl-(oxypropylene)$_6$—OH, octyl-(oxyethylene)$_{30}$—OH phenyl-(oxyoctylene)$_2$—OH, mono-(heptylphenyloxypropylene)-substituted glycerol, poly (styreneoxide), aminoethanol, 3-aminoethylpentanol, di(hydroxyethyl)amine, p-aminophenol, tri(hydroxypropyl) amine, N-hydroxyethylethylenediamine, N,N,N',N'-tetrahydroxy-trimethylenediamine, and the like.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used as (b). The carbohydrates may be exemplified by glucose, fructose, sucrose, rhamnose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful as (b). Further specific examples of such partially esterified polyhydric alcohols are the monooleate of sorbitol, distearate of sorbitol, monooleate of glycerol, monostearate of glycerol, di-dodecanoate of erythritol, and the like.

A preferred class of alcohols suitable as (b) are those polyhydric alcohols containing up to about 12 carbon atoms, and especially those containing 3 to 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, guinic acid, 2,2,6,6-tetrakis-(hydroxymethyl) cyclohexanol, 1,10-decanediol, digitalose, and the like. Aliphatic alcohols containing at least three hydroxyl groups and up to 10 carbon atoms are particularly preferred.

An especially preferred class of polyhydric alcohols for use as (b) are the polyhydric alkanols containing 3 to 10 carbon atoms and particularly, those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxymethyl-2-ethyl-1,3-propanediol (trimethylpropane), 1,2,4-hexanetriol, and the like.

From what has been stated above, it is seen that (a may contain alcoholic hydroxy substituents and (b) can contain primary, secondary, or tertiary amino substituents. Thus, amino alcohols can fall into both (a and b) provided they contain at least one primary or secondary amino group. If only tertiary amino groups are present, the amino alcohol belong only in (b).

Amino alcohols contemplated as suitable for use as (a) and/or (b) have one or more amine groups and one or more hydroxy groups. Examples of suitable amino alcohols are the N-(hydroxy-lower alkyl)amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri(2-hydroxyethyl) ethylenediamine, N,N,N'N'-tetra(2-hydroxyethyl) ethylenediamine, N-(2-hydroxyethyl)piperazine, N,N'-di-(3-hydroxypropyl)piperazine, N-(2-hydroxyethyl) morpholine, N-(2-hydroxyethyl)-2-morpholinone, N-(2-hydroxyethyl)-3-methyl-2-morpholinone, N-(2-hydroxypropyl)-6-methyl-2-morpholinone, N-(2-hydroxyethyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl)piperidine, N-(4-hydroxybutyl)piperidine, N,N-di-(2-hydroxyethyl)glycine, and ethers thereof with aliphatic alcohols, especially lower alkanols, N,N-di(3-hydroxypropyl)glycine, and he like. Also contemplated are other mono- and poly-N-hydroxyalkyl-substituted alkylene polyamines wherein the alkylene polyamine are as described above; especially those that contain 2 to 3 carbon atoms in the alkylene groups and the alkylene polyamine contains up to seven amino groups such as the reaction product of about 2 moles of propylene oxide and 1 mole of diethylenetriamine.

The alcohols suitable as (b) may be polyoxyalkylene alcohols and derivatives thereof such as hydrocarbyl ethers thereof. Such polyoxyalkylene alcohols may be prepared by reacting, for example, a hydroxy-substituted compound, $R_4(OH)_q$ wherein q is 1 to 6, preferably 2 to 3, and $R_4$ is a residue of a mono- or polyhydric alcohol or mono- or polyhydroxy phenol, naphthol, etc., reacted with an alkylene oxide such as

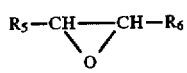

to form a hydrophobic base, $R_5$ being a lower alkyl group of up to 4 carbon atoms, $R_6$ being hydrogen or the same as $R_5$ with the proviso that the alkylene oxide does not contain in excess of 10 carbon atoms. This base is then reacted with ethylene oxide to provide a hydrophilic portion resulting in a molecule having both hydrophobic and hydrophilic portions. Compounds illustrative of $R_4$—$(OH)_q$ include aliphatic polyols such as alkylene glycols and alkane polyols such as ethylene glycol, propylene glycol, trimethylene glycol, glycerol, pentaerythritol, sorbitol, etc., and aromatic hydroxy compounds such as alkylated mono- and polyhydric phenols and naphthols such as cresol, heptaphenols, dodecylphenols, resorcinols, etc. The polyoxyalkylene alcohols useful and other alcohols useful as (b) in the process of the present invention are described in more detail in U.S. Pat. No. 4,234,435 (Meinhardt et al) in Cols. 29–32 and that disclosure is hereby incorporated by reference.

The carboxylic derivative compositions produced by reacting the carboxylic compositions (acylating reagents) of this invention with alcohols are esters. Both acidic esters and neutral esters are contemplated as being within the scope of this invention. Acidic esters are those in which some of the carboxylic acid functions in the acylating reagents are not esterified but are present as free carboxyl groups. Obviously, acid esters are easily prepared by using an amount of alcohol insufficient to esterify all of the carboxyl groups in the acylating reagents of this invention.

The acylating reagents of this invention are reacted with the alcohols according to conventional esterification techniques. This normally involves heating the acylating reagent of this invention with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed. Usually, at least about one-half equivalent of alcohol is used for each equivalent of acylating reagent. An equivalent of acylating reagent is the same as discussed above with respect to reaction with amines. An equivalent of alcohol is its molecular weight divided by the total number of hydroxyl groups present in the molecule. Thus, an equivalent weight of ethanol is its molecule. Thus, an equivalent weight of ethanol is its molecular weight while the equivalent weight of ethylene glycol is one-half its molecular weight.

Many issued patents disclose procedures for reacting high molecular weight carboxylic acid acylating agents with alcohols to produce acidic esters and neutral esters. These same techniques are applicable to preparing esters from the acylating reagents of this invention and the alcohols described above. All that is required is that the acylating reagents of this invention is substituted for the high molecular weight carboxylic acid acylating agents discussed in these patents, usually on an equivalent weight basis. The following U.S. patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,428; 3,755,169.

Reactive metals or reactive metal compounds useful as (c) are those which will form carboxylic acid metal salts with the carboxylic compositions (acylating reagents) of this invention and those which will form metal-containing complexes with the carboxylic derivative compositions produced by reacting the acylating reagents with amines and/or alcohols as discussed above. Reactive metal compounds useful as (c) for the formation of complexes with the reaction products of the acylating reagents of this invention and amines are disclosed in U.S. Pat. No. 3,306,908. Complex-forming metal reactants useful as (c) include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc. These metals are the so-called transition or coordination metals, i.e., they are capable of forming complexes by means of their secondary or coordination valence. Specific examples of the complex-forming metal compounds useful as the reactant in this invention are cobalt, cobaltous oxide, cobaltous chloride, cobaltic chloride, chromous acetate, chromic acetate, chromic sulfate, chromic hexanoate, manganous acetate, manganous benzoate, manganous nitrate, ferrous acetate, ferric benzoate, ferrous bromide, nickel nitrate, nickel dioleate, nickel stearate, cupric benzoate, cupric formate, cupric nitrite; zinc benzoate, zinc borate, zinc chromate, cadmium benzoate, cadmium carbonate, cadmium butyrate.. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the acylating reagents of this invention with the amines as described above by substituting, or on an equivalent basis, the acylating reagents of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908.

In one embodiment, carboxylic derivatives, and in particular, carboxylic derivative compositions of the invention obtained by reacting the carboxylic compositions with one or more polyamines as described above and illustrated in the following examples may be prepared which are characterized as having high TBNs. The TBN of these derivative compositions (oil free) may range from about 40 to about 180 or even 250 (100% chemical basis).

The following examples illustrate the carboxylic derivative compositions of the invention and the preparation of such compositions.

EXAMPLE 14

A mixture of 650 parts (0.69 equivalent) of the product of Example 3 and 609 parts of mineral oil is heated to 105° C. under a stream of nitrogen, and 25.8 parts (0.63 equivalent) of a commercial mixture of ethylene polyamine bottoms available from Dow are added dropwise with stirring. After the amine bottoms have been added, the mixture is maintained at 105° C. for 1 hour, heated to 165° C. and maintained at this temperature for 3 hours. A filter aid is added and the mixture is filtered. The filtrate is the desired product. The oil solution contains 55% oil, 0.67% nitrogen (theory, 0.69%), and the oil solution has a TBN of 11.6.

EXAMPLE 15

A mixture of 550 parts (0.7 equivalent) of the product of Example 5 and 697 parts of mineral oil is heated to 100° C. under a stream of nitrogen whereupon 26.2 parts (0.64 equivalent) of a commercial mixture of ethylene polyamine bottoms from Dow are added. The mixture is maintained at about 100° C. for about 1 hour, and the temperature is then raised to 165° C. and maintained at this temperature for 3 hours. A filter aid is added to the mixture which is then filtered. The filtrate is an oil solution (55% oil) of the desired product. The oil solution contains 0.67% nitrogen (theory, 0.70% and has a TBN of 12.7.

EXAMPLE 16

A mixture of 200 parts (0.1 equivalent) of the product of Example 6 and 159.2 parts of mineral oil is heated to 100° C. under a stream of nitrogen. A commercial mixture of ethylene polyamines corresponding in empirical formula to hexaethylenepentamine (3.8 parts, 0.09 equivalent) is added and this mixture is held for 1 hour. The mixture is heated to 167° C. and maintained at this temperature for 2 hours whereupon a filter aid is added and the mixture is filtered. The filtrate is an oil solution (55% oil) of the desired product. The oil solution contains 0.42% nitrogen (theory, 0.35%) and has a TBN of 8.5.

EXAMPLE 17

A mixture of 200 parts (0.1 equivalent) of the product of Example 6 and 159 parts of mineral oil is heated to 100° C. under a stream of nitrogen, and 3.7 parts (0.09 equivalent) of a commercial mixture of ethylene polyamine bottoms of Dow (E-100) are added dropwise. The mixture is maintained at 100° C. for 2 hours, and the temperature then is raised to 165° C. for 2 hours. A filter aid is added to the mixture, and the mixture is filtered. The filtrate is an oil solution (55% oil) of the desired product. The oil solution contains 0.41% nitrogen (theory, 0.35%) and has a TBN of 9.1.

EXAMPLE 18

A mixture of 350 parts (0.33 equivalent) of the product of Example 12 and 284 parts of mineral oil is heated to 110° C.

under a stream of nitrogen whereupon 14 parts (0.33 equivalent) of a commercial mixture of ethylene polyamine corresponding in empirical formula to hexaethylene pentamine are added to the mixture which is thereafter maintained at 110° C. for 30 minutes. The temperature of the mixture is then raised to 165° C. and maintained at this temperature for 4 hours. A filter aid is added to the mixture which is filtered, and the filtrate is an oil solution (55% oil) of the desired product. The oil solution has a TBN of 14.5.

EXAMPLE 19

A mixture of 350 parts (0.33 equivalent) of the product of Example 12 and 288 parts of mineral oil is heated to 100° C., and 16.4 parts (0.4 equivalent) of a commercial mixture of ethylene polyamine bottoms from Union Carbide are added under a nitrogen purge. The mixture is maintained at 100° C. for 30 minutes. It is then heated to 165° C. and maintained at this temperature for 4 hours. A filter aid is added and the mixture is filtered. The filtrate is an oil solution (55% oil) of the desired product. The oil solution contains 0.85% nitrogen (theory, 0.86%) and has a TBN of 19.1.

EXAMPLE 20

A mixture of 350 parts (0.33 equivalent) of the product of Example 12 and 284 parts of mineral oil is heated to 100° C. under a stream of nitrogen, and 11 parts (0.27 equivalent) of a commercial mixture of ethylene polyamine bottoms from Union Carbide are added at 100° C. The mixture is maintained at 100° C. for an additional 30 minutes whereupon the temperature of the mixture is raised to 165° C. After 4 hours at 165° C., a filter aid is added, and the mixture is filtered. The filtrate is an oil solution (55% oil) of the desired product. The oil solution contains 0.62% nitrogen (theory, 0.63%) having a TBN of 9.3.

EXAMPLE 21

A mixture of 175 parts (0.164 equivalent) of the product of Example 12, 175 parts (0.2 equivalent) of the product of Example 13 and 291 parts of mineral oil is heated to 100° C. under a stream of nitrogen whereupon 18.4 parts (0.435 equivalent) of a commercial mixture of ethylene polyamine bottoms from Union Carbide are added. The mixture is maintained at 100° C. for 1 hour. The mixture is then heated to 165° C. and maintained at this higher temperature for 4 hours. A filter aid is added to the mixture, and the mixture is filtered. The filtrate is an oil solution (55% oil) of the desired product. The oil solution contains 0.94% nitrogen (theory, 0.93%) and has a TBN of 21.0.

EXAMPLE 22

A mixture of 175 parts (0.164 equivalent) of the product of Example 12, 175 parts (0.199 equivalent) of the product of Example 13 and 284 parts of mineral oil is heated under a stream of nitrogen to 100° C. whereupon 12.2 parts (0.303 equivalent) of a commercial mixture from Union Carbide containing 26% by weight of diethylene triamine and 74% by weight of ethylene polyamine bottoms are added to the mixture. The mixture is maintained at 100° C. for 1 hour and thereafter heated to 165° C. and maintained at this elevated temperature for 4 hours. A filter aid is added, and the mixture is filtered. The filtrate is an oil solution (55% oil) of the desired product. The oil solution contains 0.75% nitrogen (theory, 0.66%) and has a TBN of 11.4.

EXAMPLE 23

A mixture of 233 parts (0.218 equivalent) of the product of Example 12, 117 parts (0.133 equivalent) of the product of Example 13, and 290 parts of mineral oil is heated to 110° C. under a stream of nitrogen whereupon 17.8 parts (0.41 equivalent) of a commercial mixture of ethylene polyamine bottoms from Union Carbide are added. The mixture is maintained at 110° C. for 1 hour and thereafter heated to 165° C. and maintained at the elevated temperature for 4 hours. A filter aid is added, and the mixture is filtered. The filtrate is an oil solution (55% oil) of the desired product. The oil solution contains 0.94% nitrogen (theory, 0.90%) and has a TBN of 20.3.

EXAMPLE 24

A mixture of 233 parts (0.218 equivalent) of the product of Example 12, 117 parts (0.133 equivalent) of the product of Example 13, and 284 parts of mineral oil is heated to 110° C. under a stream of nitrogen, and 12.3 parts (0.293 equivalent) of a commercial mixture of ethylene polyamine bottoms from Union Carbide are added. The mixture is maintained at 110° C. for 1 hour and thereafter heated to 165° C. and maintained at this temperature for 4 hours. A filter aid is added and the mixture is filtered. The filtrate is an oil solution (55% oil) of the desired product. The oil solution contains 0.66% nitrogen (theory, 0.64%) and has a TBN of 10.6.

EXAMPLE 25

A mixture of 1241 parts (1.16 equivalents) of the product of Example 12, 625 parts (0.71 equivalent) of the product of Example 13, and 1546 parts of mineral oil is heated to 110° C. under a stream of nitrogen, and 94.5 parts (2.25 equivalents) of a commercial mixture of ethylene polyamine bottoms from Union Carbide are added through a subsurface tube over 30 minutes. The mixture is maintained at 110° C. for an additional 30 minutes and thereafter heated to 165° C. for 4 hours. A filter aid is added and the mixture is filtered. The filtrate is an oil solution (55% oil) of the desired product. The oil solution contains 1.03% nitrogen (theory, 0.90%) and has a TBN of 20.5.

EXAMPLE 26

A mixture of 233 parts (0.218 equivalent) of the product of Example 12, 117 parts (0.133 equivalent) of the product of Example 13, and 287 parts of mineral oil is heated to 110° C. under a stream of nitrogen. A commercial mixture of ethylene amines from Union Carbide (14.1 parts, 0.351 equivalent) comprising 26% diethylene triamine and 74% of ethylene polyamine bottoms are added. The mixture is stirred for 30 minutes at 110° C. The temperature is raised to 165° C. and maintained at 165° C. for 4 hours. A filter aid is added, and the mixture is filtered. The filtrate is an oil solution (55% oil) of the desired product. The oil solution contains 0.78% nitrogen (theory, 0.76%) and has a TBN of 15.0.

EXAMPLE 27

A mixture of 233 parts (0.218 equivalent) of the product of Example 12, 117 parts (0.133 equivalent) of the product of Example 13, and 287 parts of mineral oil is heated to 110° C. under a stream of nitrogen, and 14.7 parts (0.351 equivalent) of a commercial mixture of ethylene polyamine bottoms from Union Carbide are added. The mixture is maintained at 110° C. for 30 minutes. The temperature is raised to 165 "C and maintained at this temperature for 4 hours. A filter aid is added, and the mixture is filtered. The filtrate is an oil solution (55% oil) of the desired product.

The oil solution contains 0.82% nitrogen (theory, 0.76%) and has a TBN of 14.2.

EXAMPLE 28

A mixture of 350 parts (0.33 equivalent) of the product of Example 12 and 284 parts of mineral oil is heated to 110° C. under a stream of nitrogen whereupon 13.2 parts (0.33 equivalent) of a commercial mixture of ethylene polyamines corresponding to the empirical formula for pentaethylene hexamine are added. The mixture is maintained at 110° C. for an additional 30 minutes, heated to 165° C. and maintained at 165° C. for 4 hours. A filter aid is added, and the mixture is filtered. The filtrate is the desired product containing 0.74% nitrogen (theory, 0.72%) and has a TBN of 15.2.

EXAMPLE 29

A polyisobutenyl-substituted succinic anhydride is prepared by the reaction of a high vinylidene, 2400 $\overline{M}n$ polyisobutene from BASF (Glissopal ES 3252) with an excess of maleic anhydride at 200° C. for 18 hours. The reaction product is stripped under reduced pressure, diluted with oil and filtered. The filtrate (16.7% oil) has a TAN of 23.5.

A mixture of 150 parts (0.126 equivalent) of the above-prepared polyisobutenyl succinic anhydride prepared from high vinylidene polyisobutene, 12.6 parts (0.007 equivalent) of the product of Example 1, and 135 parts of oil is heated to 100° C. under nitrogen whereupon 4.94 parts (0.120 equivalent) of a commercial mixture of ethylene polyamines available from Union Carbide and comprising a mixture of about 26% of diethylene triamine and about 74% of ethylene polyamine bottoms are added dropwise. The mixture is maintained at 100° C. for 30 minutes and thereafter heated to 167° C. and maintained at this temperature for 3 hours. A filter aid is added and the mixture is filtered. The filtrate is an oil solution (55% oil) of the desired product. The oil solution contains 0.61% nitrogen (theory, 0.56%) and has a TBN of 10.8.

EXAMPLE 30

A mixture of 374 parts (0.290 equivalent) of a commercial polyisobutenyl-substituted ($\overline{M}n$ of 1800) succinic anhydride (Adibis ADX 101C available from Adibis containing 25% oil, 26 parts (0.07 equivalent) of the product of Example 2 and 244 parts of mineral oil is heated to 110° C. under nitrogen, and 10.4 parts (0.248 equivalent) of a commercial mixture of ethylene polyamine bottoms from Union Carbide are added dropwise. The mixture is maintained at 110°0 C. for 30 minutes. The temperature is raised to 165° C. and maintained at this temperature for 3 hours. A filter aid is added and the mixture is filtered. The filtrate is an oil solution (55% oil) of the desired product and has a TBN of 9.4.

EXAMPLE 31

A mixture of 198 parts (0.55 equivalent) of Adibis ADX 101C, 30 parts (0.017 equivalent) of the product of Example 1, and 141 parts of mineral oil is heated to 100° C. under nitrogen, and 6.4 parts (0.156 equivalent) of commercially available ethylene amine mixture from Union Carbide comprising about 26% of diethylene triamine and about 74% of ethyleneamine bottoms are added dropwise to the mixture. The mixture is maintained at 110° C. for an additional 30 minutes, heated to 167° C. and maintained at this elevated temperature for 3 hours. A filter aid is added, and the mixture is filtered. The filtrate is an oil solution (55% oil) of the desired product. The oil solution contains 0.64% nitrogen (theory, 0.584%) and has a TBN of 11.3.

EXAMPLE 32

The general procedure of Example 31 is repeated with the following amounts of reactants: 167 parts (0.130 equivalent) of Adibis ADX 101C, 12.6 parts (0.007 equivalent) of the product of Example 1, 5.1 parts (0.123 equivalent) of the polyamine mixture, and 118 parts of mineral oil. The product obtained is 55% oil, 0.60% nitrogen (theory, 0.57%) and has a TBN of 10.8.

EXAMPLE 33

A polyisobutenyl succinic anhydride is prepared as follows: a mixture of 1000 parts (0.495 equivalent) of polyisobutene ($\overline{M}n$=2000, $\overline{M}w$=6400), and 106 parts (1.08 equivalents) of maleic anhydride is prepared and heated to 110° C. The mixture then is heated to 138° C. and further heated to 190° C. over 6 hours during which time 60 parts (0.85 equivalent) of gaseous chlorine is added beneath the surface. At 184°–189° C., an additional 30 parts (0.42 equivalent) of chlorine are added over 4 hours. The reaction mixture is stripped by heating at 186°–190° C. with nitrogen blowing for 3 hours. The residue is then treated with 0.4% elemental iodine at a temperature of 210° C. for 24 hours while blowing nitrogen through the mixture to reduce the chlorine content of the residue. At the end of the 24 hours, the polyisobutene-substituted succinic anhydride is recovered.

A mixture of 260 parts (0.408 equivalent) of the above-prepared iodine-treated polyisobutene-substituted succinic anhydride, 25 parts (0.014 equivalent) of the product of Example 1 and 333 parts of mineral oil is heated to 100° C. under nitrogen, and 14.1 parts (0.352 equivalent) of a commercial mixture of polyamines available from Union Carbide comprising about 26% diethylene triamine, and about 74% of ethylene polyamine bottoms are added to the mixture. The mixture is stirred at 100° C. for 1 hour. The temperature is raised to 165° C. and maintained at this temperature for 4 hours during which time a sub-surface of nitrogen purge is begun. At the end of this period, a filter aid is added and the mixture is filtered. The filtrate is an oil solution (55% oil) of the desired product. The oil solution contains 0.83% nitrogen (theory, 0.78%) and has a TBN of 12.8.

EXAMPLE 34

The general procedure of Example 33 is repeated except that the amounts of the reactants are as follows: 274 parts of the iodine-treated polyisobutene-substituted succinic anhydride, 13 parts of the product of Example 1, 14.6 parts of the commercial polyamine mixture and 349 parts of oil. The product obtained in this manner contains 55% oil and has a nitrogen content of 0.86% and a TBN of 13.2.

EXAMPLE 35

A mixture of 130 parts (0.204 equivalent) of the iodine-treated polyisobutene-substituted succinic anhydride prepared in Example 33, 163 parts (0.078 equivalent) of the product of Example 6, and 264 parts of mineral oil is heated to 110° C. under nitrogen, and 9.43 parts (0.235 equivalent) of a commercially available polyamine mixture from Union Carbide comprising a mixture of 26% diethylene triamine, and about 74% of ethylene polyamine bottoms are added.

The mixture is maintained at 110° C. for 1 hour. The temperature is thereafter raised to 160° C. while blowing with nitrogen. After 4 hours at 160° C., a filter aid is added and the mixture is filtered. The filtrate is an oil solution (55% oil) of the desired product. The oil solution contains 0.66% nitrogen (theory, 0.55%) and has a TBN of 8.7.

EXAMPLE 36

A mixture of 130 parts (0.204 equivalent) of the iodine-treated polyisobutene-substituted succinic anhydride prepared in Example 33, 163 parts (0.078 equivalent) of the product of Example 6, 294 parts of mineral oil is heated to 110° C. under nitrogen, and 9.7 parts (0.235 equivalent) of a commercial mixture of ethylene polyamine bottoms available from Dow are added. The mixture is maintained at 110° C. for a period of 1 hour and thereafter the temperature is raised to 160° C. with a sub-surface addition of nitrogen. After 4 hours at 160° C., a filter aid is added, and the mixture is filtered. The filtrate is an oil solution (55% oil) of the desired product. The oil solution contains 0.66% nitrogen (theory, 0.55%) and has a TBN of 8.8.

EXAMPLE 37

The general procedure of Example 33 is repeated with the following amount of reactants: 290 parts (0.465 equivalent) of the iodine-treated polyisobutene-substituted succinic anhydride of Example 33, 6 parts (0.004 equivalent) of the product of Example 6, 14.6 parts (0.383 equivalent) of the polyamine mixture, and 368 parts of oil. The product obtained in this manner contains 55% oil and 0.78% nitrogen (theory, 0.79%) and has a TBN of 11.3.

EXAMPLE 38

A mixture of 170 parts (0.279 equivalent) of a polyisobutene ($\overline{Mn}=1000$) substituted succinic anhydride (13% oil, TAN=92), 30 parts (0.017 equivalent) of the product of Example 1 and 141 parts of mineral oil is heated to 100° C. under a nitrogen atmosphere whereupon 11.67 parts (0.269 equivalent) of a commercial mixture of ethylene polyamine bottoms from Dow (E-100) are added dropwise. The mixture is maintained at 100° C. for 30 minutes. The temperature is raised to about 167° C. and this temperature is maintained for about 3 hours. A filter aid is added; and the mixture is filtered. The filtrate is an oil solution (55% oil) of the desired product. The oil solution contains 1.07% nitrogen (theory, 1.08%) and has a TBN of 18.2.

EXAMPLE 39

A mixture of 100 parts (0.157 equivalent) of the iodine-treated polyisobutene-substituted succinic anhydride prepared in Example 33, 115 parts (0.149 equivalent) of the polyisobutene ($\overline{Mn}=1000$) substituted succinic anhydride prepared in Example 43, 8.3 parts (0.005 equivalent) of the product of Example 1, and 246 parts of mineral oil is heated to 105° C. under a stream of nitrogen, and 10.39 parts (0.259 equivalent) of a commercial mixture available from Union Carbide and comprising about 26% of diethylene triamine and about 74% of ethylene polyamine bottoms are added. The mixture is maintained at 105° C. for 1 hour and thereafter heated to 165° C. for 4 hours. A filter aid is added, and the mixture is filtered. The filtrate (55% oil) is the desired product containing 0.84% nitrogen and having a TBN of 9.1.

EXAMPLE 40

A polyisobutenyl succinic anhydride is prepared as follows. A mixture of about 500 parts (0.5 mole) of a polyisobutene ($\overline{Mn}=1000$) and 106 parts (1.08 mole) of maleic anhydride is prepared and heated to 110° C. The mixture is then heated to 138° C. and further heated to 190° C. over 6 hours during which time 60 parts (0.85 equivalent) of gaseous chlorine is added beneath the surface. At 184°–189° C., an additional 30 parts (0.42 equivalent) of chlorine are added over 4 hours. The reaction mixture is stripped by heating at 186°–190° C. with nitrogen blowing for 3 hours. The residue then is treated with 0.3% elemental iodine at a temperature of 210° C. for about 18 hours while blowing nitrogen through the mixture to reduce the chlorine content of the residue. At the end of the 18 hours, the iodine-treated polyisobutene-substituted succinic anhydride is recovered.

A first mixture of 999 parts (1.93 equivalent) of the above-prepared iodine-treated polyisobutene-substituted succinic anhydride and 202 parts (0.059 equivalent) of the product of Example 2 is heated to 90° C. under a stream of nitrogen. A second mixture of 106.9 parts (2.64 equivalents) of a commercial mixture of ethylene polyamines from Union Carbide containing 26% by weight of diethylenetriamine and 74% by weight of ethylenepolyamine monomers, and 654.3 parts of mineral oil is heated to 110° C. under a stream of nitrogen and 5 drops of a silicone anti-foam agent are added. The first mixture is added in six equal portions to the second mixture over a 90-minute period, and at the end of the addition, the mixture is maintained for 30 minutes at 110° C. The mixture then is heated at 160° C. for 6 hours. A filter aid is added and the mixture is filtered. The filtrate is an oil solution (40% oil) of the desired product. The oil solution contains 1.92% nitrogen (theory, 1.91 %) and has a TBN of 42.9.

EXAMPLE 41

A mixture of 751.5 parts (1.45 equivalents) of the iodine-treated polyisobutene-substituted succinic anhydride prepared in Example 40 and 331.5 parts (0.097 equivalent) of the product of Example 2 is heated to 90° C. under a stream of nitrogen. This heated mixture then is added in six equal portions over a 90-minute period to a mixture of 82.57 parts (2.06 equivalents) of the commercial polyamine mixture used in Example 40 and 432.8 parts of mineral oil preheated to 110° C. The new mixture then is maintained for 3 minutes at 110° C. whereupon the temperature is raised to 160° C. and maintained at 160° C. for 6 hours. A filter aid is added, and after mixing for 15 minutes at 120° C., the mixture is filtered. The filtrate is an oil solution (40% oil) of the desired product. The oil solution contains 1.87% nitrogen (theory, 1.83%) and has a TBN of 40.7.

The carboxylic compositions and carboxylic derivative compositions of the invention described above can be employed in lubricating oil compositions and fuels. The compositions of the present invention can be added directly to lubricants and fuels although the compositions are generally diluted with a substantially Inert, normally liquid organic diluent such as mineral oil, naphtha, benzene, toluene or xylene to form an additive concentrate. These concentrates usually contain from about 20% to about 99% by weight of the solvent/diluent and from about 1% to about 80% by weight of at least one of the carboxylic compositions or carboxylic derivative compositions of the invention. The concentrates also may contain one or more other additives known in the art as described below.

The lubricating oil compositions of the present invention comprise a major amount of oil of lubricating viscosity and a minor amount of at least one composition selected from the carboxylic compositions and carboxylic derivative compositions of the invention, or a mixture of two or more compositions of the invention.

The lubricating compositions and methods of this invention employ an oil of lubricating viscosity, including natural or synthetic lubricating oils and mixtures thereof. Natural oils include animal oils, vegetable oils, mineral lubricating oils, solvent or acid treated mineral oils, and oils derived from coal or shale. Synthetic lubricating oils include hydrocarbon oils, halo-substituted hydrocarbon oils, alkylene oxide polymers, esters of dicarboxylic acids and polyols, esters of phosphorus-containing acids, polymeric tetrahydrofurans and silicon-based oils.

Specific examples of the oils of lubricating viscosity are described in U.S. Pat. No. 4,326,972 which is herein incorporated by reference for its disclosure relating to lubricating oils. A basic, brief description of lubricant base oils appears in an article by D. V. Brock, "Lubricant Oils", *Lubricant Engineering*, Vol. 43, pages 184–185, March, 1987. This article is herein incorporated by reference for its disclosures relating to lubricating oils. A description of oils of lubricating viscosity occurs in U.S. Pat. No. 4,582,618 (Col. 2, line 37 through Col. 3, line 63, inclusive), herein incorporated by reference for its disclosure to oils of lubricating viscosity.

Generally, the lubricants of the present invention contain a lubricating and improving amount of one or more of the carboxylic compositions or carboxylic derivative compositions of this invention, e.g., sufficient to provide the lubricant with the improved detergent/dispersant and/or V.I. properties. Normally, the amount employed will be from about 0.05% to about 20%, preferably from about 1% to about 10% of the total weight of the lubricating composition. This amount is exclusive of solvent/diluent medium. In lubricating compositions operated under extremely adverse conditions, such as lubricating compositions for marine diesel engines, the dispersants may be present in amounts of up to about 30% by weight or more, of the total weight of the lubricating composition.

The carboxylic derivative compositions of the present invention are particularly useful in diesel lubricating compositions. The carboxylic derivative compositions have been found to reduce self-induced viscosity increase of lubricants used in diesel engines. The lubricating compositions of the present invention are also useful as crankcase lubricating oils for spark-ignited and compression-ignited internal combustion engines such as automobile and truck engines, and marine and railroad diesel engines. Automatic transmission fluids, transaxle lubricants, gear lubricants, metal-working lubricants, hydraulic fluids and other lubricating oil and grease compositions can also benefit from the incorporation therein of the carboxylic derivative compositions of the present invention.

The carboxylic compositions and carboxylic derivative compositions of the present invention may be utilized in lubricating compositions by themselves or in combination with any other known additive which includes, but is not limited to other dispersant/detergents of the ashless or ash-producing types, anti-wear agents, extreme pressure agents, emulsifiers, demulsifiers, friction modifiers, anti-rust agents, corrosion inhibitors, viscosity improvers, pour point depressants, dyes, and foam inhibitors. These additives may be present in various amounts depending on the needs of the final product.

Corrosion inhibitors, extreme pressure and anti-wear agents include but are not limited to metal salts of a phosphorus acid, chlorinated aliphatic hydrocarbons; phosphorus esters including dihydrocarbyl and trihydrocarbyl phosphites; boron-containing compounds including borate esters; dimercaptothiadiazole derivatives; benzotriazole derivatives; amino-mercaptothiadiazole derivatives; and molybdenum compounds.

Viscosity improvers include but are not limited to polyisobutenes, polymethyacrylate acid esters, polyacrylate acid esters, diene polymers, polyalkyl styrenes, alkenyl aryl conjugated diene copolymers (preferably styrene-maleic anhydride copolymer esters), polyolefins and multi-functional viscosity improvers.

Pour point depressants are a particularly useful type of additive often included in the lubricating oils described herein. See for example, page 8 of "Lubricant Additives" by C. V. Smalheer and R. Kennedy Smith (Lezius-Hiles Company Publishers, Cleveland, Ohio, 1967).

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

These and other additives are described in greater detail in U.S. Pat. No. 4,582,618 (Col. 14, line 52 through Col. 17, line 16, inclusive), herein incorporated by reference for its disclosure of other additives that may be used in combination with the present invention.

The fuel compositions of the present invention contain a major proportion of a normally liquid fuel and a minor amount of at least one carboxylic composition, carboxylic derivative composition or mixture of said composition. A normally liquid fuel is usually a hydrocarbonaceous petroleum distillate fuel such as motor gasoline as defined by ASTM Specification D-439 and diesel fuel or fuel oil as defined by ASTM Specification D-396.

Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels which are mixtures of one or more hydrocarbonaceous fuels and one or more non-hydrocarbonaceous materials are also contemplated. Examples of such mixtures are combinations of gasoline and ethanol and of diesel fuel and ether. Particularly preferred is gasoline, that is, a mixture of hydrocarbons having an ASTM distillation range from about 60° C. at the 10% distillation point to about 205° C. at the 90% distillation point.

Generally, these fuel compositions contain an amount of the fuel additive of this invention sufficient to improve one or more properties of the fuel such as rust-inhibition, dispersancy, etc.; usually this amount is about 0.005% to about 0.5% by volume, preferably about 0.01% to about 0.1% by volume, based on the volume of such fuel compositions.

The fuel compositions can contain, in addition to the fuel additive compositions of this invention, other additives which are well known to those of skill in the art. These include antiknock agents such as tetraalkyl lead compounds, lead scavengers such as haloalkanes (e.g., ethylene dichloride and ethylene dibromide), deposit preventers or modifiers such as triaryl phosphates, dyes, cetane improvers, antioxidants such as 2,6-di-tertiary-butyl-4-methylphenol, rust inhibitors such as alkylated succinic acids and anhydrides, bacteriostatic agents, gum inhibitors, metal deactivators, demulsifiers, upper cylinder lubricants and anti-icing agents.

The fuel additive compositions of this invention can be added directly to the fuel, or they can be diluted with a substantially inert, normally liquid organic diluent such as naphtha, benzene, toluene, xylene or a normally liquid fuel as described above, to form an additive concentrate. These concentrates generally contain from about 20% to about 90% by weight of the composition of this invention and may contain, in addition one or more other conventional additives known in the art or described hereinabove.

The fuel additive compositions of this invention can be provided in concentrate form with less than the above-indicated levels of additives, and then be added directly to the fuel along with additional amounts of the compositions of this invention and other known additives, or be further diluted with additives prior to the addition to the fuel until the level of additives is at the desired level.

The carboxylic derivative compositions of the present invention are useful as dispersants in lubricants and fuels, particularly when low chlorine or no chlorine dispersants are desired. These carboxylic derivative compositions also provide high blend viscosities when blended into oils and oil formulations. When the carboxylic derivative compositions of the invention obtained by reaction of the carboxylic compositions with an amine reactant as described above are included in an oil concentrates, and the carboxylic to nitrogen ratio in the carboxylic derivative composition is less than 1, the concentrates do not exhibit a significant increase in viscosity ("viscosity creep") on storage or standing.

Desirable oil blend thickening is obtained with these carboxylic derivative compositions even though it is typically difficult to obtain oil blend thickening with amine dispersants having a carboxylic to nitrogen ratio of less than 1. The polyamine carboxylic derivative compositions of the invention are effective in preventing or reducing soot-induced viscosity increase in diesel lubricant formulations, particularly when the derivative compositions (oil free) have a TBN of at least about 20, preferably at least about 25 or 30, and the compositions are derived from the terpolymers described herein. The polyamine carboxylic derivative compositions having a TBN in the range of 30 or 40 up to about 100 are particularly useful in heavy-duty diesel applications.

The following examples illustrate the concentrates of the present invention:

|  | %/Wt. |
|---|---|
| Concentrate I | |
| Product of Example 1 | 90 |
| Mineral oil | 10 |
| Concentrate II | |
| Product of Example 14 | 85 |
| Mineral oil | 15 |
| Concentrate III | |
| Product of Example 40 | 45 |
| Reaction product of ethylene polyamine with polyisobutenyl succinic anhydride | 23 |
| Mineral oil | 32 |
| Concentrate IV | |
| Product of Example 40 | 40 |
| Reaction product of ethylene polyamine with polyisobutenyl succinic anhydride | 40 |
| Basic calcium sulfonate | 7.5 |
| Mineral oil | 12.5 |

Typical lubricating oil compositions according to the present invention are exemplified in the following lubricating oil examples.

| Lubricant I | |
|---|---|
| Product of Example 1 | 6.0 |
| Mineral oil | 94.0 |
| Lubricant II | |
| Product of Example 14 | 6.0 |
| Mineral oil | 94.0 |
| Lubricant III | |
| Product of Example 14 | 5.8 |
| Basic calcium alkylated benzene sulfonate | 0.9 |
| Silicone antifoam agent | 100 ppm |
| Mineral oil | Balance |
| Lubricant IV | |
| Product of Example 20 | 5.5 |
| Basic magnesium alkylated benzene sulfonate | 0.5 |
| Mixture of mono- and di-alkylated ($C_9$) diphenyl-amines | 0.2 |
| Zinc salt of mixed secondary dialkyldithiophosphate | 1.0 |
| Mineral oil | Balance |

TABLE

| | %/Wt. | | |
|---|---|---|---|
| Lubricant | V | VI | VII |
| Product of Example 22 | — | — | 4.5 |
| Product of Example 40 | 4.0 | — | — |
| Product of Example 41 | — | 4.0 | — |
| Reaction product of ethylene polyamine with polyisobutenyl succinic anhydride | 2.0 | 2.0 | 1.5 |
| Mixture of mono- and dialkylated ($C_9$) diphenylamines | 0.25 | 0.25 | 0.3 |
| Basic calcium alkylated benzene sulfonate | 0.75 | 0.75 | 0.9 |
| Basic magnesium alkylated benzene sulfonate | 0.34 | 0.34 | 0.4 |
| Basic calcium sulfonate containing 5% by weight of polyisobutenyl succinic anhydride | 0.30 | 0.30 | — |
| Basic calcium salt of a sulfurized tetrapropenyl phenol | 0.56 | 0.56 | — |
| Zinc salt of mixed secondary dialkyldithiophosphate | 1.1 | 1.1 | 1.1 |
| Pour point depressant | 0.11 | 0.11 | 0.10 |
| VI Improver* | 0.58 | .60 | 0.70 |
| Silicone antifoam agent | 100 ppm | 100 ppm | 100 ppm |
| Mineral oil | Balance | Balance | Balance |

*A polyisoprene star polymer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A carboxylic composition prepared by reacting a mixture comprising (A) an alpha-olefin polymer;

(B) a low molecular weight terpolymer derived from a mixture of monomers comprising ethylene, an alpha-olefin containing from 3 to about 20 carbon atoms, and a non-conjugated polyene; wherein said terpolymer has a number average molecular weight of in the range of about 1,000-15,000; and (C) an alpha,beta-monounsaturated dicarboxylic acid or reactive derivative thereof.

2. The composition of claim 1 wherein the alpha-olefin polymer (A) is derived from an alpha-olefin containing from about 2 to about 20 carbon atoms.

3. The composition of claim 1, wherein said composition contains chlorine.

4. The composition of claim 1 wherein the alpha-olefin polymer (A) is a polymer or copolymer of an alpha olefin characterized by the formula $$R—R^1C=CH_2$$

wherein R is hydrogen, or a linear or branched chain alkyl group containing 1 to about 10 carbon atoms and $R^1$ is hydrogen or a lower alkyl group.

5. The composition of claim 1 wherein the alpha-olefin polymer (A) has a number average molecular weight of from about 300 to about 10,000.

6. The composition of claim 1 wherein the alpha-olefin polymer (A has a number average molecular weight of from about 800 to about 3000.

7. The composition of claim 1 wherein at least about 30% of the unsaturation in the alpha-olefin polymer is in the terminal position.

8. The composition of claim 1 wherein the alpha-olefin polymer is a polyisobutylene containing terminal unsaturation wherein at least about 30% of the terminal groupings are in a structure having an alpha-olefinic bond or structures capable of isomerizing to such alpha-olefinic structures.

9. The composition of claim 1 wherein the alpha-olefin of (B) is characterized by the formula $$RCH=CH_2$$

wherein R is a linear or branched alkyl group containing from 1 to about 10 carbon atoms.

10. The composition of claim 1 wherein the alpha-olefin of (B) is propylene.

11. The composition of claim 1 wherein the non-conjugated polyene of (B) is a non-conjugated diene.

12. The composition of claim 11 wherein the diene is selected from the group consisting of aliphatic dienes and bicyclic dienes.

13. The composition of claim 11 wherein the diene is dicyclopentadiene or an alkylidene norbornene.

14. The composition of claim 1 wherein the ethylene content of the terpolymer (B) is from about 25% to about 85% by weight.

15. The composition of claim 1 wherein the non-conjugated polyene content of the terpolymer of (B) is from about 1% to about 15% by weight.

16. The composition of claim 1 wherein the alpha,beta-monounsaturated dicarboxylic acid or reactive derivative thereof (C) is characterized by the formula $$XC(O)—Z—C(O)X'$$

wherein X and X' are each independently selected from the group consisting of OH, O-lower alkyl, a halogen atom, or taken together are a single oxygen atom, and Z is an alkenylene group.

17. The composition of claim 16 wherein X and X' are OH groups or taken together are a single oxygen atom.

18. The composition of claim 16 wherein Z is —CH=CH—.

19. The composition of claim 1 wherein the composition is prepared by reacting the mixture at a temperature of from about 125° C. up to about 250° C.

20. The composition of claim 1 prepared from a mixture comprising from about 60 parts to about 99.5 parts by weight of (A), from about 0.5 parts to about 40 parts by weight of (B), and from about 4 parts to about 60 parts by weight of (C) per one hundred parts of the combination of (A) and (B).

21. A carboxylic composition prepared by reacting a mixture comprising (A) an alpha-olefin polymer derived from an alpha-olefin containing from 2 to about 4 carbon atoms;

(B) a low molecular weight terpolymer derived from a mixture of monomers comprising ethylene, propylene, and a non-conjugated diene, wherein said terpolymer having a number average molecular weight in the range of about 1,000-15,000; and (C) maleic acid or maleic anhydride.

22. The composition of claim 21 wherein the number average molecular weight of the polymer (A) is from about 800 to about 3000.

23. The composition of claim 21 wherein the alpha-olefin polymer (A) is a polyisobutene having a number average molecular weight of from about 800 to about 4000.

24. The composition of claim 21 wherein the polyisobutene has at least 50% of its unsaturation in the terminal position.

25. The composition of claim 21 wherein the non-conjugated diene is a bicyclic diene.

26. The composition of claim 21 wherein the non-conjugated diene of (B) is dicyclopentadiene or an alkylidene norbornene.

27. The composition of claim 21 wherein the ethylene content of the terpolymer (B) is from about 25% to about 85% by weight.

28. The composition of claim 21 wherein the non-conjugated diene content of the terpolymer of (B) is from about 1% to about 15% by weight.

29. The composition of claim 21 wherein the composition is prepared by reacting the mixture at a temperature of from about 125° C. up to about 250° C.

30. The carboxylic composition of claim 21 wherein the mole ratio of (A) and (B):(C) is such that there are at least 0.8 equivalent of (C) for each equivalent of the combination of (A) and (B).

31. A carboxylic derivative composition prepared by reacting at least one carboxylic composition of claim 1 with a reactant selected from the group consisting of (a) amines characterized by the presence within their structure of at least one H—N< group, (b) alcohols, (c) reactive metals or reactive metal compounds, and d) a combination of two or more of any of (a) through (c), the components of (d) being reacted with one or more of the carboxylic compositions simultaneously or sequentially in any order.

32. The carboxylic derivative composition of claim 31 wherein the amine is an aliphatic, cycloaliphatic or aromatic polyamine.

33. The carboxylic derivative composition of claim 31 wherein the amine is characterized by the general formula

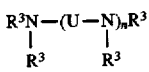

wherein n is from 1 to about 10, each $R^3$ is independently a hydrogen atom, a hydrocarbyl group, or a hydroxy-substituted or amino-substituted hydrocarbyl group having up to about 30 carbon atoms, or two $R^3$ groups on different nitrogen atoms can be joined together to form a U group with the proviso that at least one $R^3$ group is a hydrogen atom, and U is an alkylene group of from about 1 to about 10 carbon atoms.

34. The carboxylic derivative composition of claim 31 wherein the amine is a condensed polyamine obtained by the reaction of at least one polyamine containing at least one primary or secondary amino group with at least one hydroxyalkyl or hydroxyaryl compound.

35. The carboxylic derivative composition of claim 31 wherein the carboxylic composition is reacted with an alkylene polyamine.

36. A carboxylic derivative composition prepared by reacting at least one carboxylic composition of claim 21 with a reactant selected from the group consisting of (a) amines characterized by the presence within their structure of at least one H—N< group, (b) alcohols, (c) reactive metals or reactive metal compounds, and (d) a combination of two or more of any of (a) through (c), the components of (d) being reacted with one or more of the carboxylic compositions simultaneously or sequentially in any order.

37. The carboxylic derivative composition of claim 36 wherein the amine is an aliphatic, cycloaliphatic or aromatic polyamine.

38. The carboxylic derivative composition of claim 36 wherein the amine is characterized by the general formula

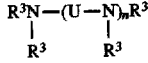

wherein n is from 1 to about 10, each $R^3$ is independently a hydrogen atom, a hydrocarbyl group, or a hydroxy-substituted or amino-substituted hydrocarbyl group having up to about 30 carbon atoms, or two $R^3$ groups on different nitrogen atoms can be joined together to form a U group with the proviso that at least one $R^3$ group is a hydrogen atom, and U is an alkylene group of from about 2 to about 10 carbon atoms.

39. The carboxylic derivative composition of claim 36 wherein the amine is a condensed polyamine obtained by the reaction of at least one polyamine containing at least one primary or secondary amino group with at least one hydroxyalkyl or hydroxyaryl compound.

40. A carboxylic composition comprising a mixture of (A) a first carboxylic composition prepared by reacting an alpha-olefin polymer with an alpha, beta-monounsaturated dicarboxylic acid or reactive derivative thereof, and (B) a second carboxylic composition prepared by reacting a terpolymer derived from a mixture of monomers comprising ethylene, an alpha-olefin containing from about 3 to about 20 carbon atoms, and a non-conjugated polyene with an alpha, beta-monounsaturated dicarboxylic acid or reactive derivative thereof, wherein said terpolymer has a number average molecular weight in the range of 1,000-15,000.

41. The carboxylic composition of claim 40 wherein the alpha-olefin polymer is derived from an olefin containing from about 2 to about 20 carbon atoms.

42. The composition of claim 40 wherein the alpha-olefin polymer is a polyisobutene.

43. The composition of claim 40 wherein the alpha-olefin polymer has a number average molecular weight of from about 300 to about 10,000.

44. The composition of claim 40 wherein the alpha-olefin polymer has a number average molecular weight of from about 800 to about 3000.

45. The carboxylic composition of claim 40 wherein the alpha-olefin polymer has at least 50% of its unsaturation in the terminal position.

46. The composition of claim 40 wherein the alpha-olefin of the terpolymer is characterized by the formula $$RCH=CH_2$$

wherein R is a linear or branched alkyl group containing from 1 to about 10 carbon atoms.

47. The composition of claim 40 wherein the alpha-olefin of the terpolymer is propylene.

48. The composition of claim 40 wherein the non-conjugated polyene of the terpolymer is a non-conjugated diene.

49. The composition of claim 48 wherein the diene is selected from the group consisting of aliphatic dienes and bicyclic dienes.

50. The composition of claim 48 wherein the diene is a dicyclopentadiene or an alkylidene norbornene.

51. The composition of claim 40 wherein the ethylene content of the terpolymer is from about 25% to about 85% by weight.

52. The composition of claim 40 wherein the non-conjugated polyene content of the terpolymer is from about 1% to about 15% by weight.

53. The composition of claim 40 wherein the alpha,beta-monounsaturated dicarboxylic acid or reactive derivative thereof is characterized by the formula $$XC(O)-Z-C(O)X'$$

wherein X and X' are each independently selected from the group consisting of OH, O-lower alkyl, a halogen atom, or taken together are a single oxygen atom, and Z is an alkenylene group.

54. The composition of claim 53 wherein X and X' are OH groups or taken together are a single oxygen atom.

55. The composition of claim 53 wherein Z is —CH=CH—.

56. The composition of claim 40 wherein the alpha,beta-unsaturated dicarboxylic acid or reactive derivative thereof is maleic acid or maleic anhydride.

57. The composition of claim 40 comprising from about 60% to about 99.5% by weight of the first carboxylic composition (A) and from about 0.5% to about 40% by weight of the second carboxylic composition (B).

58. The composition of claim 40 wherein the first carboxylic composition (A) is prepared by reacting an alpha-olefin polymer with an alpha,beta-monounsaturated dicarboxylic acid or reactive derivative thereof in the presence of chlorine, and the reaction product is subsequently contacted with a source of iodine or bromine for a sufficient amount of time to reduce the chlorine content.

59. A carboxylic derivative composition prepared by reacting the carboxylic composition of claim 40 with a reactant selected from the group consisting of (a) amines characterized by the presence within their structure of at least one H—N< group, (b alcohols, (c) reactive metal or reactive metal compounds, and (d) a combination of two or more of any of (a) through (c) the components of (d) being reacted with one or more of the carboxylic compositions simultaneously or sequentially in any order.

60. The carboxylic derivative composition of claim 59 wherein the carboxylic composition is reacted with an amine characterized by the presence within its structure of at least one H—N< group.

61. The carboxylic derivative composition of claim 60 wherein the amine is an aliphatic, cycloaliphatic or aromatic polyamine.

62. The carboxylic derivative composition of claim 60 wherein the amine is characterized by the general formula

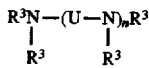

wherein n is from 1 to about 10, each $R^3$ is independently a hydrogen atom, a hydrocarbyl group, or a hydroxy-substituted or amino-substituted hydrocarbyl group having up to about 30 carbon atoms, or two $R^3$ groups on different nitrogen atoms can be joined together to form a U group with the proviso that at least one $R^3$ group is a hydrogen atom, and U is an alkylene group of from about 2 to about 10 carbon atoms.

63. The carboxylic derivative composition of claim 60 wherein the amine is a condensed polyamine obtained by the reaction of at least one polyamine containing at least one primary or secondary amino group with at least one hydroxyalkyl or hydroxyaryl compound.

64. The carboxylic derivative composition of claim 60 is an alkylene polyamine.

65. A concentrate for formulating lubricating compositions and fuels comprising from about 20% to about 99% by weight of a normally liquid, substantially inert organic solvent/diluent and from about 1% to about 80% by weight of at least one carboxylic composition of claim 1.

66. A concentrate for formulating lubricating compositions and fuels comprising from about 20% to about 99% by weight of a normally liquid, substantially inert organic solvent/diluent and from about 1% to about 80% by weight of at least one carboxylic derivative composition of claim 31.

67. A lubricating composition comprising a major amount of oil of lubricating viscosity and a minor amount of at least one carboxylic composition of claim 1.

68. A lubricating composition comprising a major amount of oil of lubricating viscosity and a minor amount of at least one carboxylic derivative composition of claim 31.

69. A concentrate for formulating lubricating compositions and fuels comprising from about 20% to about 99% by weight of a normally liquid, substantially inert organic solvent/diluent and from about 1% to about 80% by weight of at least one carboxylic composition of claim 40.

70. A concentrate for formulating lubricating compositions and fuels comprising from about 20% to about 99% by weight of a normally liquid, substantially inert organic solvent/diluent and from about 1% to about 80% by weight of at least one carboxylic composition of claim 59.

71. A lubricating composition comprising a major amount of an oil of lubricating viscosity and a minor amount of at least one carboxylic composition of claim 40.

72. A lubricating composition comprising a major amount of an oil of lubricating viscosity and a minor amount of at least one carboxylic composition of claim 59.

73. The lubricating oil composition of claim 68 wherein the oil composition is a diesel lubricating oil composition.

74. The lubricating oil composition of claim 72 wherein the oil composition is a diesel lubricating oil composition.

75. A process for reducing soot-induced viscosity increase of lubricants used in diesel engines which comprises lubricating the diesel engine with the lubricating oil of claim 68.

76. A process for reducing soot-induced viscosity increase of lubricants used in diesel engines which comprises lubricating the diesel engine with the lubricating oil of claim 72.

* * * * *